United States Patent
Jung et al.

(10) Patent No.: US 12,302,311 B2
(45) Date of Patent: May 13, 2025

(54) METHOD AND APPARATUS FOR TRANSMITTING AND RECEIVING MULTIPLE PORTIONS OF DATA IN WIRELESS COOPERATIVE COMMUNICATION SYSTEM

(71) Applicant: Samsung Electronics Co., Ltd., Gyeonggi-do (KR)

(72) Inventors: Euichang Jung, Gyeonggi-do (KR); Suha Yoon, Gyeonggi-do (KR); Hoondong Noh, Gyeonggi-do (KR); Jinhyun Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 382 days.

(21) Appl. No.: 17/669,963

(22) Filed: Feb. 11, 2022

(65) Prior Publication Data
US 2022/0174697 A1    Jun. 2, 2022

Related U.S. Application Data

(63) Continuation of application No. PCT/KR2020/008851, filed on Jul. 7, 2020.

(30) Foreign Application Priority Data

Aug. 14, 2019    (KR) .................. 10-2019-0099657

(51) Int. Cl.
*H04W 72/12*    (2023.01)
*H04L 1/00*    (2006.01)
(Continued)

(52) U.S. Cl.
CPC ....... *H04W 72/1263* (2013.01); *H04L 1/0003* (2013.01); *H04L 1/08* (2013.01); *H04L 5/0051* (2013.01); *H04W 72/20* (2023.01)

(58) Field of Classification Search
CPC . H04W 72/1263; H04W 72/20; H04W 72/23; H04L 1/0003; H04L 1/08;
(Continued)

(56) References Cited

U.S. PATENT DOCUMENTS 8,427,978 B2 * 4/2013 Xiao .................. H04L 1/0026
                                                      370/254
8,737,369 B2    5/2014 Yeon et al.
(Continued)

FOREIGN PATENT DOCUMENTS

CN    104734821    6/2015
CN    108696943    10/2018
(Continued)

OTHER PUBLICATIONS

European Search Report dated Jul. 25, 2022 issued in counterpart application No. 20851591.6-1213, 9 pages.
(Continued)

*Primary Examiner* — Abdullahi E Salad
(74) *Attorney, Agent, or Firm* — The Farrell Law Firm, P.C.

(57) ABSTRACT

The disclosure relates to a fifth generation (5G) or sixth generation (6G) communication system for supporting a higher data transmission rate. A method and an apparatus for transmitting and receiving one or more pieces of data between a transmission node and a user equipment (UE) to perform cooperative communication in a wireless communication system, thereby improving communication reliability, are provided.

20 Claims, 14 Drawing Sheets

(51) Int. Cl.
*H04L 1/08* (2006.01)
*H04L 5/00* (2006.01)
*H04W 72/1263* (2023.01)
*H04W 72/20* (2023.01)

(58) Field of Classification Search
CPC ... H04L 5/0051; H04L 1/0031; H04L 1/0009; H04L 1/1819; H04L 1/189; H04L 1/1893; H04L 1/1896; H04L 1/18; H04L 1/1812; H04B 7/024; H04B 7/06; H04B 7/0697
See application file for complete search history.

(56) References Cited

U.S. PATENT DOCUMENTS

| | | | |
|---|---|---|---|
| 9,526,057 | B2 | 12/2016 | Yi et al. |
| 9,980,262 | B2 | 5/2018 | Gao et al. |
| 10,834,718 | B2 | 11/2020 | Shin et al. |
| 10,958,380 | B2 | 3/2021 | Park et al. |
| 11,411,687 | B2 | 8/2022 | Park et al. |
| 11,463,207 | B2 | 10/2022 | Wang et al. |
| 2011/0237283 | A1* | 9/2011 | Shan ............... H04L 5/0091 455/509 |
| 2012/0320863 | A1 | 12/2012 | Lee et al. |
| 2015/0327287 | A1* | 11/2015 | Kim ................. H04B 7/024 370/329 |
| 2018/0270799 | A1* | 9/2018 | Noh ................. H04L 1/1812 |
| 2019/0393937 | A1* | 12/2019 | Kim ................. H04W 72/23 |
| 2021/0044400 | A1* | 2/2021 | Jiang ............... H04L 5/0048 |

FOREIGN PATENT DOCUMENTS

| | | | |
|---|---|---|---|
| CN | 109474392 | 3/2019 | |
| CN | 109478979 | 3/2019 | |
| KR | 10-2011-0113543 | 10/2011 | |
| KR | 10-1740731 | 5/2017 | |
| KR | 10-2018-0105555 | 9/2018 | |
| WO | WO 2012/157968 | 11/2012 | |
| WO | WO 2018/203618 | 11/2018 | |
| WO | WO 2018/228487 | * 12/2018 | ............ H04W 72/04 |
| WO | WO 2019/085998 | 5/2019 | |

OTHER PUBLICATIONS

PCT/ISA/210 Search Report issued on PCT/KR2020/008851, Jul. 13, 2020, pp. 5.
PCT/ISA/237 Written Opinion issued on PCT/KR2020/008851, Jul. 13, 2020, pp. 5.
Qualcomm Incorporated, 3GPP TSG-RAN WG1 Meeting #97, R1-1907289, May 13-17, 2019, Reno, Nevada, USA, "Multi-TRP Enhancements", pp. 27.
Ericsson, 3GPP TSG RAN WG1 Meeting RAN1#96-bis, R1-1905513, Xi'an, China, Apr. 8-12, 2019, "On multi-TRP and multi-panel", pp. 21.
ZTE, 3GPP TSG RAN WG1 #97, R1-1906241, Reno, USA, May 13-17, 2019, "On single PDCCH design for multi-TRP and multi-panel", pp. 7.
Huawei, HiSilicon, 3GPP TSG RAN WG1 Meeting #97, R1-1907706Reno, USA, May 13-17, 2019, "Summary of AI: 7.2.8.2 Enhancements on Multi-TRP", pp. 68.
Chinese Office Action dated Apr. 30, 2024 issued in counterpart application No. 202080057298.3, 18 pages.
Indian Examination Report dated Mar. 19, 2024 issued in counterpart application No. 202217007123, 2 pages.
EP Intention to Grant dated Jun. 11, 2024 issued in counterpart application No. 20851591.6-1206, 89 pages.
Chinese Office Action dated Jan. 24, 2025 issued in counterpart application No. 202080057298.3, 9 pages.

* cited by examiner

METHOD AND APPARATUS FOR TRANSMITTING AND RECEIVING MULTIPLE PORTIONS OF DATA IN WIRELESS COOPERATIVE COMMUNICATION SYSTEM

CROSS REFERENCE TO RELATED APPLICATIONS

This application is a Bypass Continuation Application of International Application No. PCT/KR2020/008851, which was filed on Jul. 7, 2020, and is based on and claims priority under 35 U.S.C. § 119 to Korean Patent Application No. 10-2019-0099657, which was filed in the Korean Intellectual Property Office on Aug. 14, 2019, the entire disclosure of each of which is incorporated herein by reference.

BACKGROUND

1. Field

The disclosure relates generally to a wireless communication network and, more particularly, to a method and an apparatus for transmitting and receiving multiple data in a wireless cooperative communication system.

2. Description of Related Art

Fifth generation (5G) mobile communication technologies define broad frequency bands such that high transmission rates and new services are possible, and can be implemented not only in "Sub 6 GHz" bands such as 3.5 GHZ, but also in "Above 6 GHz" bands referred to as mm Wave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

A wireless communication system is evolving from initially providing voice-oriented services into a broadband wireless communication system for providing high-speed and high-quality packet data services according to a communication standard, for example, high speed packet access (HSPA), LTE or evolved universal terrestrial radio access (E-UTRA)), LTE-advanced (LTE-A), or LTE-Pro of 3GPP, high rate packet data (HRPD) or ultra-mobile broadband (UMB) of 3GPP2, and IEEE 802.16e.

As a representative example of a broadband wireless communication system, an LTE system employs an orthogonal frequency division multiplexing (OFDM) scheme for a downlink (DL) and employs a single-carrier frequency division multiple access (SC-FDMA) scheme for an uplink (UL). The UL refers to a radio link for a user equipment (UE) or a mobile station (MS) to transmit data or a control signal to an eNode B or a base station (BS), and the downlink refers to a radio link for the eNode B to transmit data or a control signal to the UE. These multiple access schemes allocate and manage time-frequency resources for carrying data or control information per user not to overlap with each other, that is, to be orthogonal to each other, thereby dividing data or control information for each user.

A post-LTE communication system, i.e., a 5G communication system needs to be able to freely reflect various demands from users and service providers and is thus required to support services satisfying various requirements, such as enhanced mobile broadband (eMBB), massive machine-type communication (mMTC), and ultra-reliable low-latency communication (URLLC).

The eMBB is intended to provide a further enhanced data rate than that supported by existing LTE, LTE-A, or LTE-Pro. For example, in a 5G communication system, for one base station, eMBB needs to be able to provide a peak data rate of 20 gigabits per second (Gbps) in a DL and a peak data rate of 10 Gbps in the UL. Further, eMBB needs to provide an increased user-perceived data rate. In order to meet these requirements, improved transmission and reception technologies including an enhanced MIMO transmission technology are required. In addition, it is possible to satisfy a data rate required for a 5G communication system by employing a frequency bandwidth wider than 20 megahertz (MHz) in a frequency band ranging from 3 to 6 GHz or a 6-GHz frequency band or higher instead of a 2-GHz band currently used for LTE.

In a 5G communication system, mMTC is considered to support application services, such as the IoT. To efficiently provide the IoT, mMTC may require support for access of a large number of UEs in a cell, enhanced UE coverage, increased battery time, and reduced UE cost, for example. The IoT is attached to various sensors and various devices to provide a communication function and thus needs to be able to support a large number of UEs (e.g., 1,000,000 UEs/km$^2$) in a cell. A UE supporting mMTC is highly likely to be located in a shadow area not covered by a cell, such as the basement of a building, due to the nature of services and may thus require wider coverage than for other services provided by the 5G communication system. A UE supporting mMTC needs to be configured as a low-cost UE, and may require a very long battery life because it is difficult to frequently change the battery of the UE.

Finally, URLLC is a mission-critical cellular-based wireless communication service, which is used for remote control of robots or machinery, industrial automation, unmanned aerial vehicles, remote health care, and emergency alerts, for example, and needs to provide ultralow-latency and ultra-reliable communication. A URLLC-supporting service is required not only to satisfy an air interface latency of less than 0.5 milliseconds but also to have a packet error rate of 10-5 or less. Therefore, for the URLLC-supporting service, a 5G system needs to provide a shorter transmission time interval (TTI) than that of other services and also requires a design for allocating a wide resource in a frequency band. The foregoing mMTC, URLLC, and eMBB are merely examples of different service types, and service types to which the disclosure is applied are not limited to the foregoing examples.

The foregoing services considered in a 5G communication system need to be provided in fusion with each other based on one framework. That is, for efficient resource management and control, it is preferable that the services are controlled and transmitted as one integrated system rather than being operated independently.

With the advance of wireless communication systems as described above, there is a need in the art for data transmission/reception schemes for network cooperative communication.

SUMMARY

The disclosure has been made to address at least the above-mentioned problems and/or disadvantages and to provide at least the advantages described below.

Accordingly, an aspect of the disclosure is to provide a method and an apparatus for transmitting and receiving one or more pieces of data between a transmission node and a UE to perform cooperative communication in a wireless communication system, thereby improving communication reliability.

Another aspect of the disclosure is to provide a method and apparatus by which, when network cooperative communication is used in a wireless communication system, it is possible to improve the reliability of data/control signal received by a UE.

According to an aspect of the disclosure, a method performed by a terminal in a wireless communication system includes receiving control information from a base station, identifying whether an initial transmission signal or a retransmission signal is transmitted from at least one transmission reception point (TRP), based on the control information, and receiving, from the at least one TRP, the retransmission signal in case that it is identified that the retransmission signal is transmitted.

According to an aspect of the disclosure, a method performed by a base station in a wireless communication system includes generating control information for identifying whether an initial transmission signal or a retransmission signal is transmitted from at least one TRP, transmitting the control information to a terminal, and transmitting the retransmission signal to the terminal via the at least one TRP in case that the control information indicates that the retransmission signal is transmitted.

According to an aspect of the disclosure, a terminal in a wireless communication system includes a transceiver, and a controller configured to receive control information from a base station via the transceiver, identify whether an initial transmission signal or a retransmission signal is transmitted from at least one TRP, based on the control information, and receive, from the at least one TRP via the transceiver, the retransmission signal in case that it is identified that the retransmission signal is transmitted.

According to an aspect of the disclosure, a base station in a wireless communication system includes a transceiver, and a controller configured to generate control information for identifying whether an initial transmission signal is transmitted or a retransmission signal is transmitted from at least one TRP, transmit the control information to a terminal via the transceiver, and transmit, to the terminal, the retransmission signal via the at least one TRP in case that the control information indicates that the retransmission signal is transmitted.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
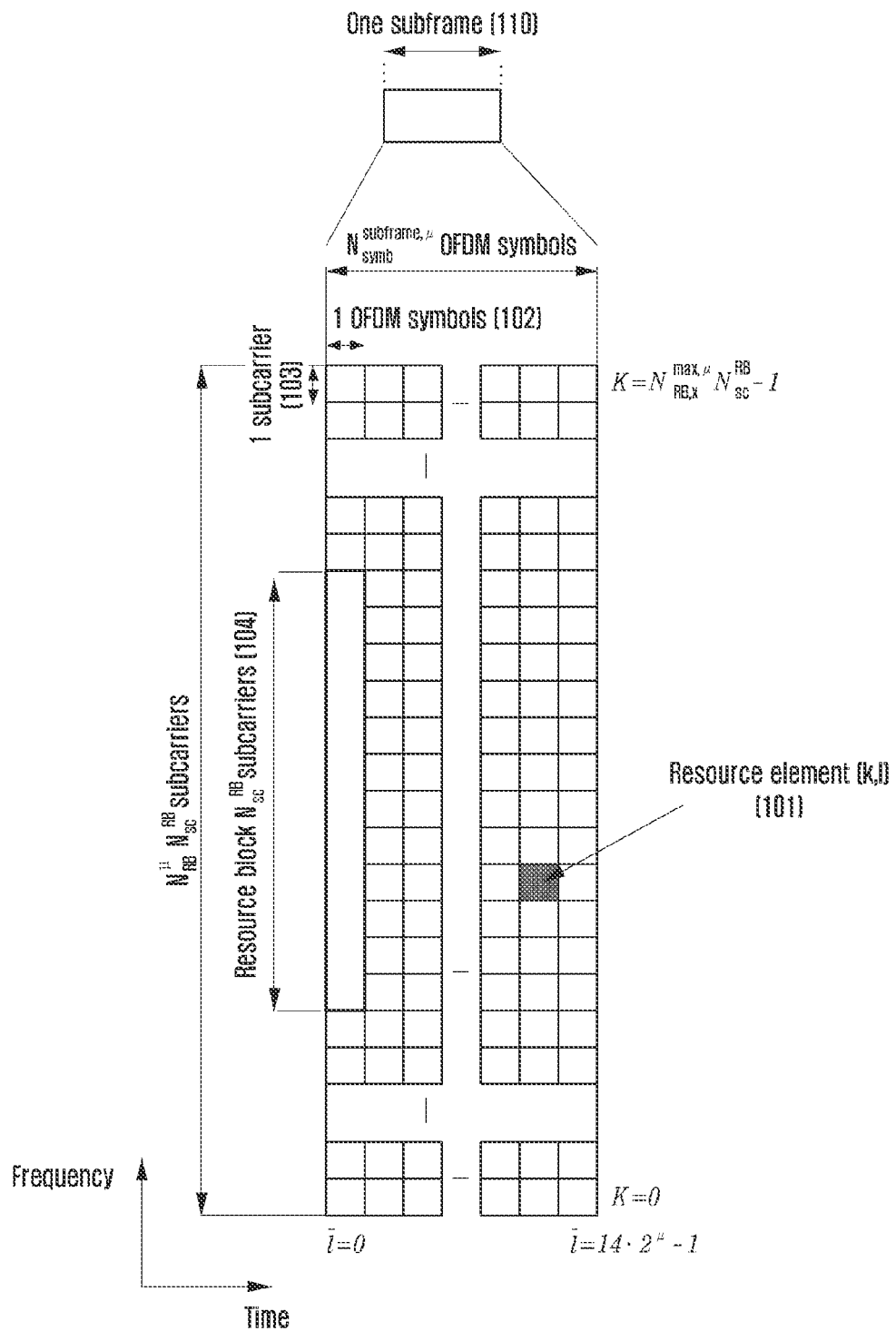
FIG. 1 illustrates a transmission structure in a time-frequency domain in an LTE or evolved universal terrestrial radio access (E-UTRA) system, an LTE-advanced (LTE-A) system, an NR system, or a similar wireless communication system according to an embodiment.

Hereinafter, embodiments of the disclosure will be described in detail with reference to the accompanying drawings. Descriptions of well-known functions and/or configurations will be omitted for the sake of clarity and conciseness.

In the accompanying drawings, some elements may be exaggerated, omitted, or schematically illustrated. the size of each element does not completely reflect the actual size. In the drawings, identical or corresponding elements are provided with identical reference numerals.

The advantages and features of the disclosure and manners in which to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure. Throughout the specification, the same or like reference numerals designate the same or like elements.

As used herein, a unit refers to a software element or a hardware element, such as a field programmable gate array (FPGA) or an application specific integrated circuit (ASIC), which performs a predetermined function. However, the unit does not always have a meaning limited to software or hardware. The unit may be constructed either to be stored in an addressable storage medium or to execute one or more processors. Therefore, the unit includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the unit may be either combined into a smaller number of elements, or a unit, or divided into a larger number of elements, or a unit. Moreover, the elements and units or may be implemented to reproduce one or more CPUs within a device or a security multimedia card. The unit in the embodiments may include one or more processors.

The terms which will be described below are defined in consideration of the functions in the disclosure, and may be different according to users, intentions of the users, or customs. Therefore, the definitions of the terms should be made based on the contents throughout the specification. In the following description, a base station is an entity that allocates resources to terminals, and may be at least one of a gNODE B (gNB), an eNODE B (eNB), a node B, a BS, a wireless access unit, a base station controller, and a node on a network. A terminal may include a UE, an MS, a cellular phone, a smartphone, a computer, or a multimedia system capable of performing communication functions. In the disclosure, a DL refers to a radio link via which a base station transmits a signal to a terminal, and a UL refers to a radio link via which a terminal transmits a signal to a base station. Examples of the base station and the terminal are not limited thereto.

The following description of the disclosure is directed to technology for receiving broadcast information from a base station by a terminal in a wireless communication system. The disclosure relates to a communication technique for converging IoT technology with a 5G communication system designed to support a higher data transfer rate beyond the 4G system, and a system therefor. The disclosure may be applied to intelligent services (e.g., smart homes, smart buildings, smart cities, smart cars or connected cars, healthcare, digital education, retail business, security and safety-related services, etc.) based on 5G communication technology and IoT-related technology.

In the following description, terms referring to broadcast information, control information, communication coverage, state changes (e.g., events), network entities, messages, and device elements, for example, are illustratively used for the sake of convenience. Therefore, the disclosure is not limited by the terms as used below, and other terms referring to subjects having equivalent technical meanings may be used.

In the following description, some of terms and names defined in the 3rd generation partnership project LTE (3GPP LTE) standards may be used for convenience of description.

However, the disclosure is not limited by these terms and names, and may be similarly applied to systems that conform to other standards.

Although embodiments will be described herein with reference to an LTE, LTE-A, LTE Pro, or NR system, these embodiments may also be applied to other communication systems having a similar technical background or channel form. The embodiments may also be applied to other communication systems through some modifications without departing from the scope of the disclosure as determined by those skilled in the art.

Hereinafter, a frame structure of a 5G system will be described in detail with reference to accompanying drawings.

FIG. 1 illustrates a transmission structure in a time-frequency domain in an LTE system, an LTE-A system, an NR system, or a similar wireless communication system according to an embodiment.

Figure 2:
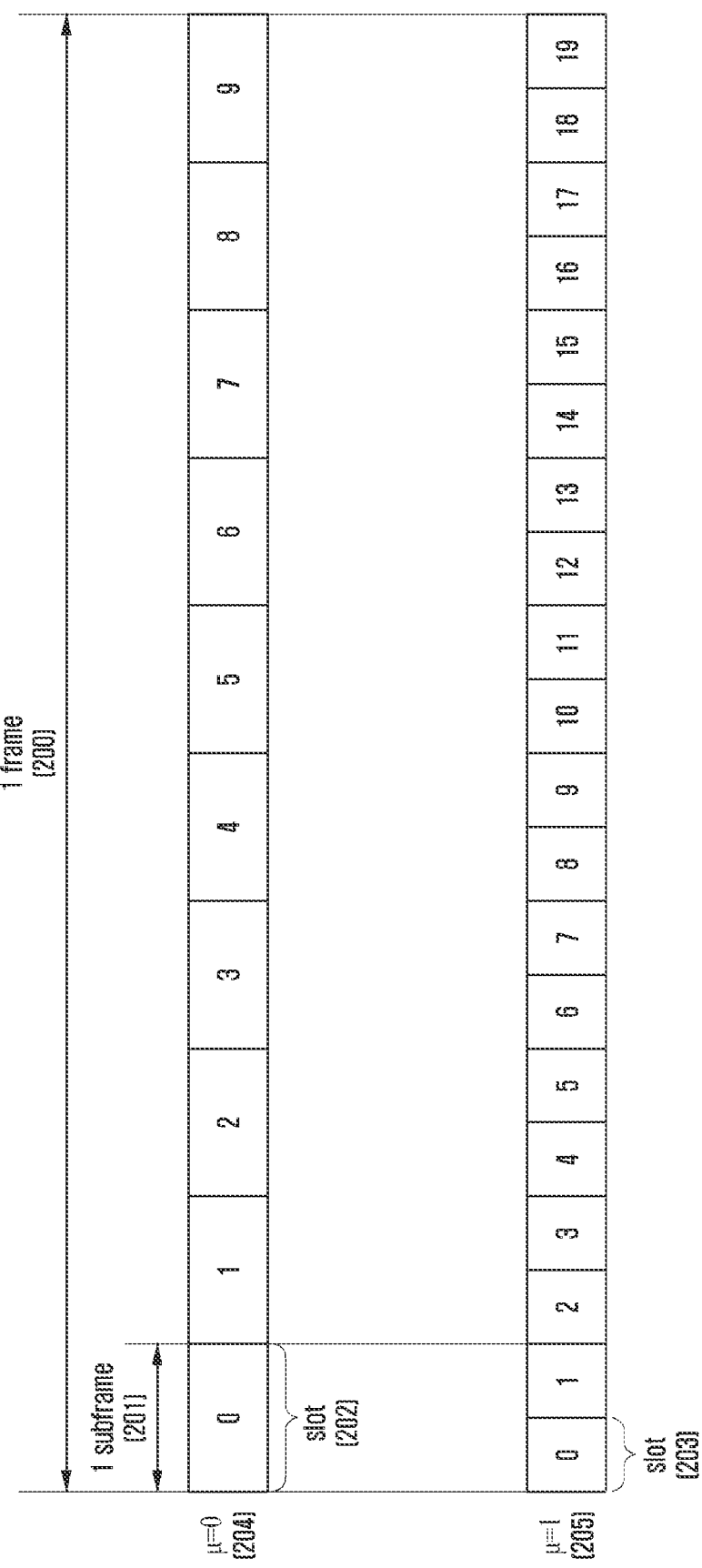
FIG. 2 illustrates the structures of a frame, a subframe, and a slot in 5G according to an embodiment.

FIG. 1 shows the basic structure of the time-frequency domain, which is a radio resource region in which data or a control channel is transmitted in a 5G system. In FIG. 1, the horizontal axis denotes a time domain, and the vertical axis denotes a frequency domain. The basic unit of a resource in the time-frequency domain is a resource element (RE) 101, which may be defined by one OFDM symbol 102 on the time axis and one subcarrier 103 on the frequency axis. In the frequency domain, $N_{SC}^{RB}$ (e.g., 12) consecutive REs may form one resource block (RB) 104. FIG. 2 illustrates the structures of a frame, a subframe, and a slot in 5G according to an embodiment.

In FIG. 2, the slot structure is considered in a 5G system and includes a frame 200, a subframe 201, and two slots 202 and 203. One frame 200 may be defined as 10 milliseconds (ms). One subframe 201 may be defined as 1 ms. Therefore, one frame 200 may include a total of ten subframes 201 (0 to 9). One slot 202 and 203 may be defined as 14 OFDM symbols (i.e., the number of symbols per slot ($N_{symb}^{slot}$)=14). One subframe 201 may include one or the illustrated plurality of slots 202 and 203, and the number of slots 202 and 203 per subframe 201 may vary depending on a set subcarrier spacing value μ 204 and 205. In the example of FIG. 2, as the set subcarrier spacing value, μ=0 (204) and μ=1 (205). When μ=0 (204), one subframe 201 may include one slot 202; when μ=1 (205), one subframe 201 may include two slots 203. That is, the number of slots per subframe ($N_{slot}^{subframe,\mu}$) may vary depending on the set subcarrier spacing value u, and the number of slots per frame ($N_{slot}^{frame,\mu}$) may vary accordingly. $N_{slot}^{subframe,\mu}$ and $N_{slot}^{frame,\mu}$ according to each subcarrier spacing setting u may be defined as in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In NR, one component carrier (CC) or serving cell can include up to 250 RBs. Therefore, when a UE always receives the entire serving cell bandwidth as in LTE, the power consumption of the UE may be extreme. To solve this problem, a base station may configure one or more BWPs for the UE, thus supporting the UE in changing a reception region in the cell. In NR, the base station may configure an initial BWP, which is the bandwidth of CORESET #0 or a common search space (CSS), for the UE through a master information block (MIB). Subsequently, the base station may configure a first BWP for the UE through radio resource control (RRC) signaling and may report at least one piece of BWP configuration information that may be indicated through DCI in the future. The base station may report a BWP ID through DCI, thereby indicating a band for the UE to use to the UE. When the UE fails to receive the DCI in the currently allocated BWP for a specified time or longer, the UE may return to a default BWP and may attempt to receive the DCI.

Figure 3:
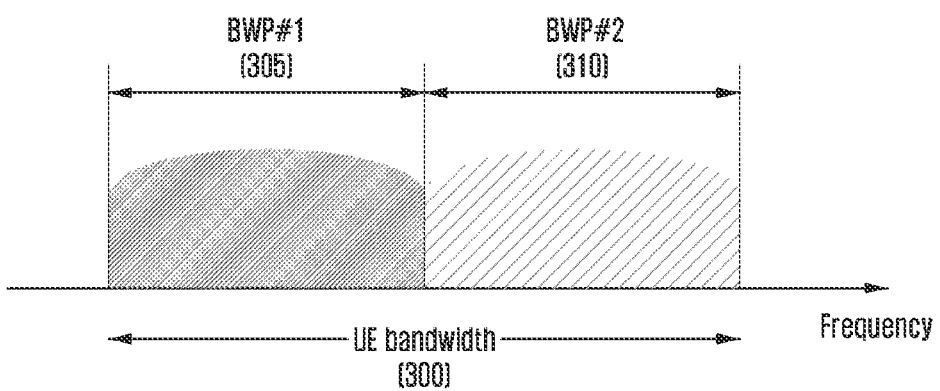
FIG. 3 illustrates the configuration of a BWP in a wireless communication system according to an embodiment.

FIG. 3 illustrates the configuration of a BWP in a wireless communication system according to an embodiment.

Referring to FIG. 3, a UE bandwidth 300 includes two BWPs, that is, BWP #1 305 and BWP #2 310. A base station may configure one BWP or a plurality of BWPs for a UE and may configure pieces of information about each BWP as follows in Table 2.

TABLE 2

| Configuration information 1 | Bandwidth of a BWP (the number of PRBs included in the BWP) |
|---|---|
| Configuration information 2 | Frequency position of a BWP (e.g., an offset value relative to reference point A, in which the reference point may be, for example, the center frequency of a carrier, a synchronization signal, a synchronization signal raster, or the like) |
| Configuration information 3 | Numerology of a BWP (e.g., subcarrier spacing, cyclic prefix (CP) length, or the like) |
| Other information | |

In addition to the pieces of configured information illustrated in Table 2, various parameters related to the BWP may be configured for the UE. The foregoing pieces of information may be transmitted from the base station to the UE through higher-layer signaling, such as RRC signaling. At least one of the one configured BWP or the plurality of configured BWPs may be activated. Whether to activate a configured BWP may be indicated from the base station to the UE semi-statically through RRC signaling or dynamically through a medium access control (MAC) control element (CE) or DCI.

The configuration of the BWP supported by the 5G communication system may be used for various purposes.

In one example, when a bandwidth supported by a UE is smaller than a system bandwidth, the bandwidth may be supported by configuring a BWP. For example, the frequency position of the BWP (configuration information 2) in Table 2 may be set for the UE, enabling the UE to transmit and receive data at a particular frequency position within the system bandwidth.

Alternatively, a base station may configure a plurality of BWPs for a UE in order to support different numerologies. For example, in order to support data transmission and reception using both a subcarrier spacing of 15 kHz and a subcarrier spacing of 30 kHz for a random UE, two BWPs may be configured to use a subcarrier spacing of 15 kHz and a subcarrier spacing of 30 kHz, respectively. Different BWPs may be subjected to frequency division multiplexing (FDM). When the UE intends to transmit and receive data with particular subcarrier spacing, a BWP configured with the subcarrier spacing may be activated.

A base station may also configure BWPs having different bandwidths for a UE in order to reduce power consumption of the UE. For example, when a UE supports a very large bandwidth, such as 100 MHz, and always transmits and receives data in the bandwidth, the UE may consume a large amount of power. In particular, it is very inefficient in power consumption for the UE to unnecessarily monitor a downlink control channel over the large bandwidth of 100 MHz even when there is no traffic. Therefore, in order to reduce power consumption of the UE, the base station may configure a BWP having a relatively small bandwidth of 20 MHz, for the UE. The UE may perform a monitoring operation in the 20-MHz BWP in the absence of traffic, and may transmit and receive data using the 100-MHz bandwidth according to an indication from the base station when the data is generated.

Figure 4:
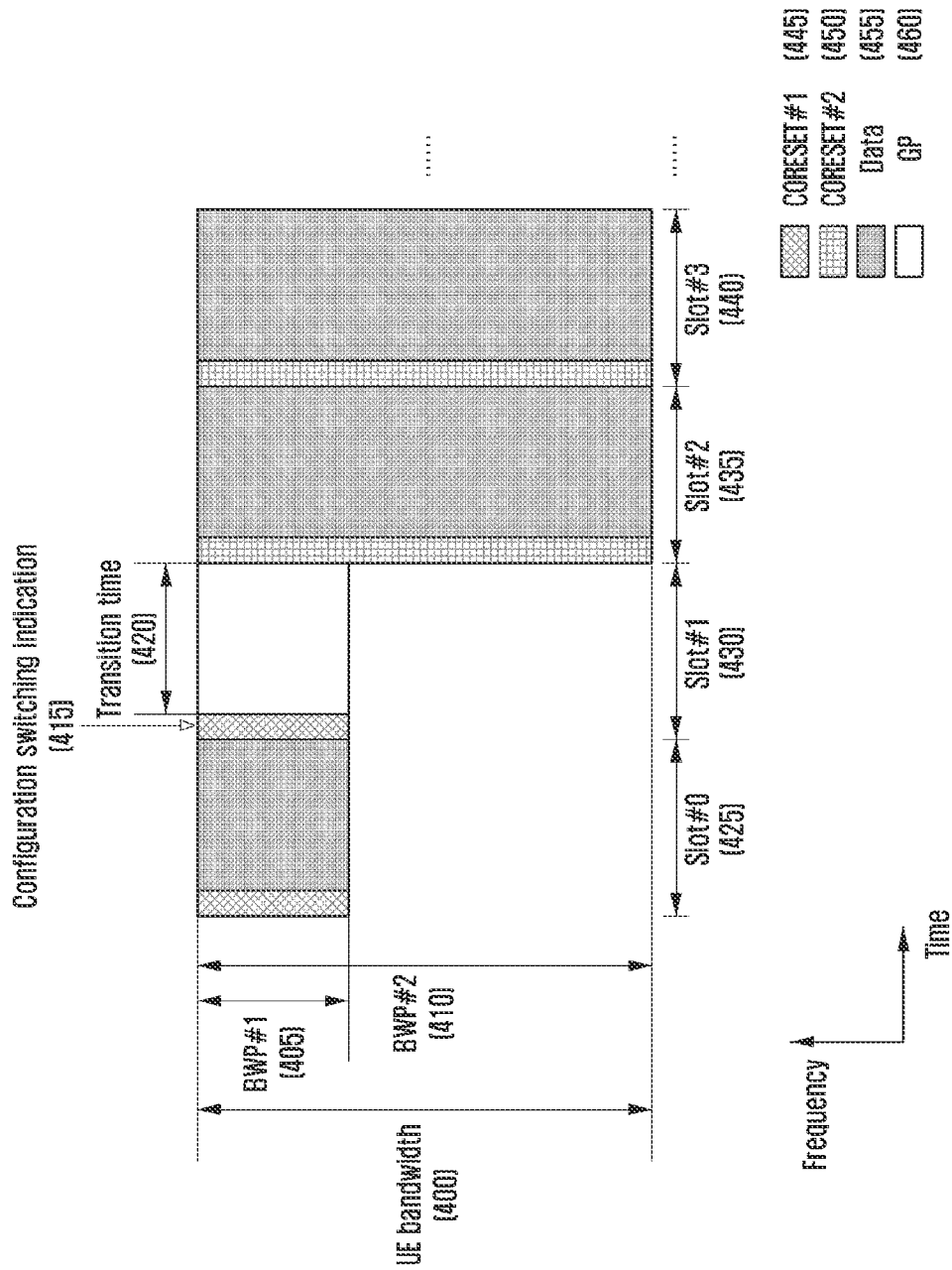
FIG. 4 illustrates indicating and changing a BWP in a wireless communication system according to an embodiment.

FIG. 4 illustrates a method of dynamically changing the configuration of a BWP in a wireless communication system according to an embodiment.

Referring to FIG. 4, as described in Table 2, a base station may configure one BWP or a plurality of BWPs for a UE and may report, as the configuration of each BWP, information about the bandwidth of the BWP, the frequency position of the BWP, and the numerology of the BWP to the UE. FIG. 4 illustrates two BWPs, BWP #1 405 and BWP #2 410, as configured in the UE bandwidth 400 for one UE. One or a plurality of the configured BWPs may be activated, as shown in FIG. 4. BWP #1 402 of the configured BWPs is activated in slot #0 425, and the UE may monitor a physical downlink control channel (PDCCH) in control region 1 445 (i.e., a control resource set (CORESET) #1) configured in BWP #1 405 and may transmit and receive data 455 in BWP #1 405. The control region in which the UE receives the PDCCH may vary according to which BWP is activated among the configured BWPs, and thus the bandwidth in which the UE monitors the PDCCH may vary.

The base station may further transmit an indicator for switching the configuration of a BWP to the UE, which switching may be considered identical to activating a particular BWP (e.g., switching an activated BWP from BWP A to BWP B). The base station may transmit a configuration switching indicator to the UE in a particular slot. After receiving the configuration switching indicator from the base station, the UE may determine a BWP to be activated by applying a changed configuration according to the configuration switching indicator from a particular time, and may monitor a PDCCH in a control region configured in the activated BWP.

In FIG. 4, the base station may transmit a configuration switching indicator 415 indicating a switch of the activated BWP from existing BWP #1 405 to BWP #2 410 to the UE in slot #1 430. After receiving the indicator, the UE may activate BWP #2 410 according to the content of the indicator. A transition time 420 for a BWP switch may be required, and the time to switch and apply a BWP to be activated may be determined accordingly. In FIG. 4, a transition time 420 of one slot is required after receiving the configuration switching indicator 415. Data transmission and reception may not be performed in the transition time 420 (GP, gap, 460). Accordingly, BWP #2 410 may be activated in slot #2 435, and thus an operation of transmitting and receiving a control channel 450 (i.e., CORESET #2) and data 455 via the BWP may be performed.

The base station may pre-configure one BWP or a plurality of BWPs for the UE via higher-layer signaling and may indicate activation by mapping the configuration switching indicator 415 with one of BWP configurations preconfigured by the base station. For example, a log 2N-bit indicator may indicate one BWP selected from among N preconfigured BWPs. Table 3 below shows indicating configuration information about a BWP using a two-bit indicator.

TABLE 3

| Indicator value | BWP configuration |
| --- | --- |
| 00 | Bandwidth configuration A configured via higher-layer signaling |
| 01 | Bandwidth configuration B configured via higher-layer signaling |
| 10 | Bandwidth configuration C configured via higher-layer signaling |
| 11 | Bandwidth configuration D configured via higher-layer signaling |

The configuration switching indicator 415 for the BWP illustrated in Table 4 may be transmitted from the base station to the UE via MAC CE signaling or L1 signaling (e.g., common DCI, group-common DCI, or UE-specific DCI).

The time to apply BWP activation according to the foregoing configuration switching indicator 415 for the BWP illustrated in Table 4 may depend on a predefined value (e.g., the configuration switch is applied after N (≥1) slots since receiving the configuration switching indicator), may be set by the base station for the UE via higher-layer signaling, or may be transmitted via the configuration switching indicator 415. theThe time to apply the configuration switch may be determined by combining the above methods. After receiving the configuration switching indicator 415 for the BWP, the UE may apply a switched configuration from the time obtained by the above method.

Figure 5:
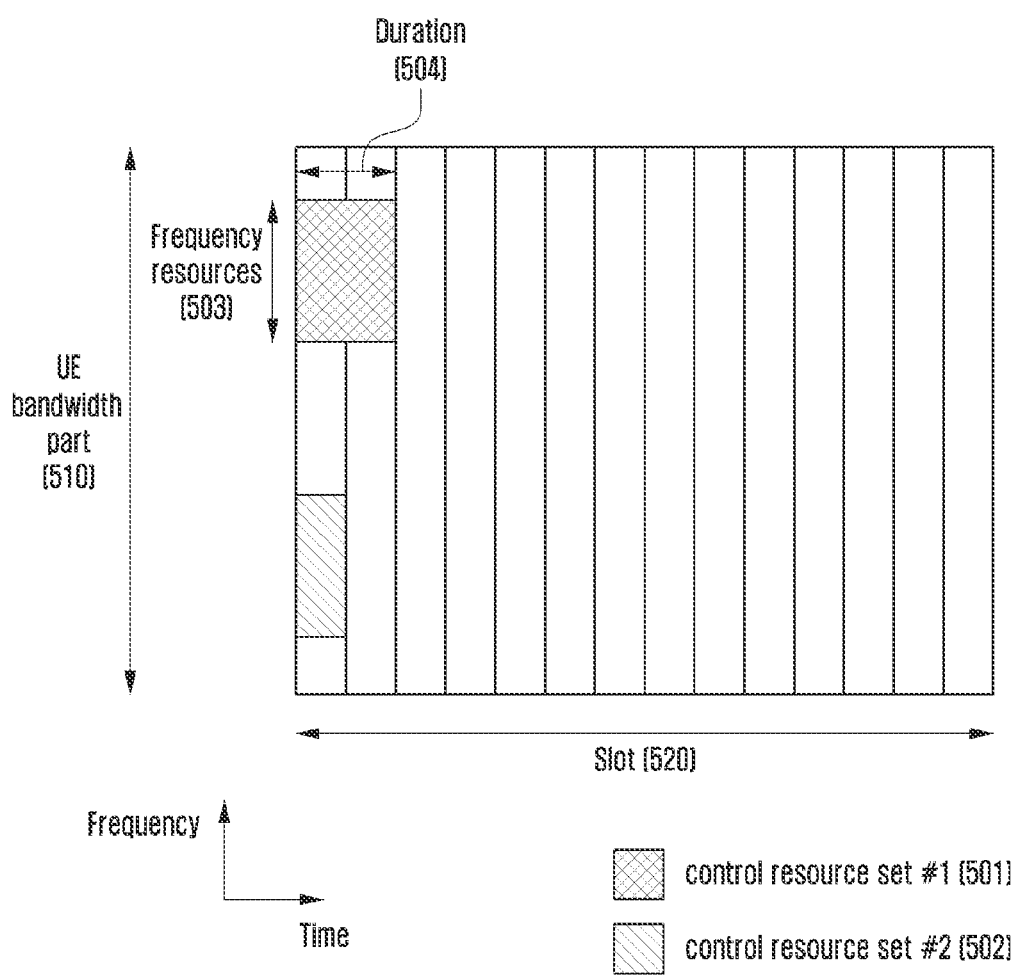
FIG. 5 illustrates configuring a control region for a downlink control channel in a wireless communication system according to an embodiment.

FIG. 5 illustrates configuring a control region for a downlink control channel in a wireless communication system according to an embodiment.

FIG. 5 illustrates a control resource set (CORESET) in which a downlink control channel is transmitted in a 5G wireless communication system. FIG. 5 illustrates an example in which a UE BWP 510 is configured on a frequency axis and two control resource sets (control resource set #1 (CORESET #1) 501 and control resource set #2 (CORESET #2) 502) are configured in one slot 520 on a time axis. The CORESETs 501 and 502 may be configured in a particular frequency resource 503 in the entire UE BWP 510 on the frequency axis. The CORESETs 501 and 502 may be configured with one or a plurality of OFDM symbols on the time axis, which may be defined as control region set duration 504. In FIG. 5, CORESET #1 501 is configured with a CORESET duration of two symbols, and CORESET #2 502 is configured with a CORESET duration of one symbol.

The CORESET in 5G described above may be configured by a base station for a UE through higher-layer signaling, such as a system information block (SIB), an MIB, or RRC signaling. Configuring a CORESET for a UE indicates that information, such as the identity of the CORESET, a frequency position of the CORESET, and the symbol duration of the CORESET, is provided for the UE. For example, pieces of information illustrated in Table 4 below may be included.

TABLE 4

```
ControlResourceSet ::=                         SEQUENCE {
    -- Corresponds to L1 parameter 'CORESET-ID'
        controlResourceSetId               ControlResourceSetId,
    (Control region identity(Identity))
        frequencyDomainResources           BIT STRING (SIZE
(45)),
    (Frequency-domain resource allocation information)
        duration
           INTEGER (1..maxCoReSetDuration),
    (Time-domain resource all information)
        cce-REG-MappingType
        CHOICE {
    (CCE-to-REG mapping type)
           interleaved
           SEQUENCE {
               reg-Bundle Size
               ENUMERATED {n2, n3, n6},
               (REG bundle size)
                   precoderGranularity
               ENUMERATED {sameAsREG-bundle, allContiguousRBs},
                   interleaverSize
               ENUMERATED {n2, n3, n6}
                   (Interlever size)
                   shiftIndex
               INTEGER(0..maxNrofPhysicalResourceBlocks-1)
                   OPTIONAL
                   (Interlever shift (Shift))
        },
        nonInterleaved                      NULL
        },
        tci-StatesPDCCH
           SEQUENCE(SIZE (1..maxNrofTCI-StatesPDCCH)) OF TCI-StateId
                   OPTIONAL,
        (QCL configuration information)
        tci-PresentInDCI                    ENUMERATED
{enabled}
                   OPTIONAL, -- Need S
}
```

In Table 4, tci-StatesPDCCH (referred to as a transmission configuration indicator (TCI) state) configuration information may include information about the index of one or a plurality of synchronization signals (SSs)/physical broadcast channel (PBCH) blocks in a quasi co-located (QCL) relationship with a demodulation reference signal (DMRS) transmitted in the CORESET or the index of a channel state information reference signal (CSI-RS).

The NR may provide the following specific frequency-domain resource allocations (FD-RAs) in addition to frequency-domain resource candidate allocation through a BWP indication.

Figure 6:
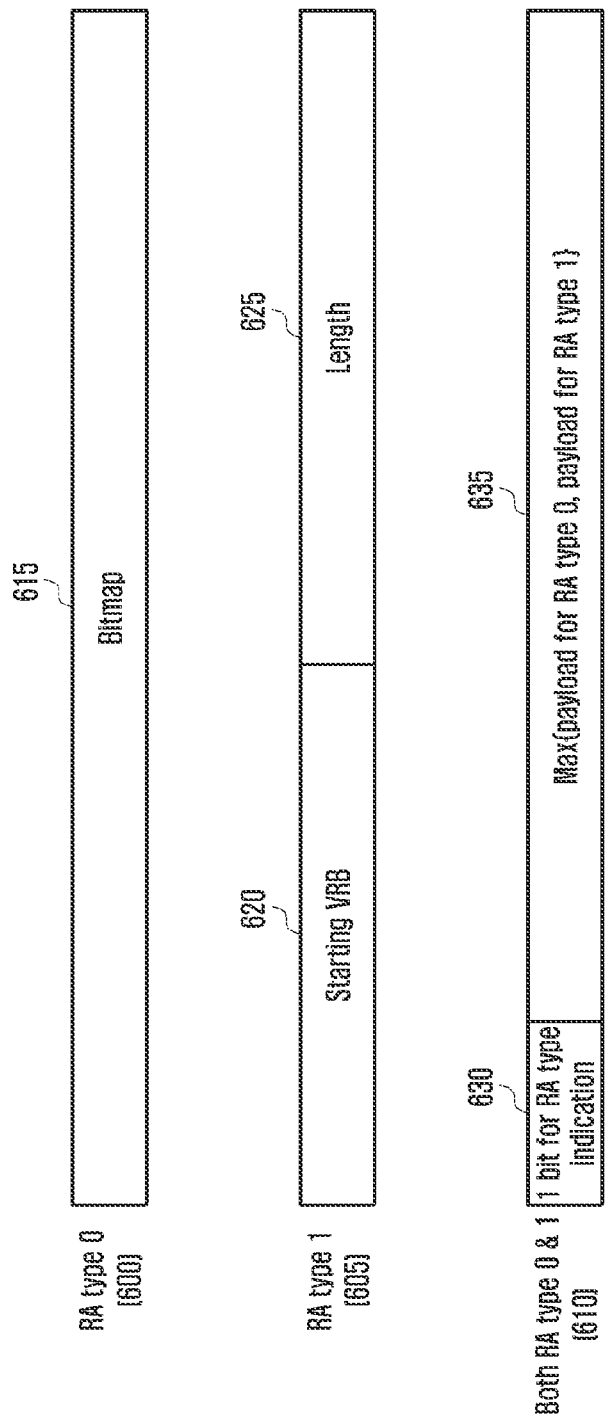
FIG. 6 illustrates a physical downlink shared channel (PDSCH frequency-domain resource allocation example in a wireless communication system according to an embodiment.

FIG. 6 illustrates a PDSCH frequency-domain resource allocation example in a wireless communication system according to an embodiment.

FIG. 6 illustrates three frequency-domain resource allocation methods, which are type 0 600, type 1 605, and a dynamic switch 610 that may be configured through a higher layer in NR.

Referring to FIG. 6, when a UE is configured to use only resource type 0 through higher-layer signaling (600), some DCI for allocating a PDSCH to the UE has a bitmap of a number of resource block group (NRBG) bits, a condition for which will be described as in Table 5 according to a BWP size allocated by a BWP indicator and a higher-layer parameter rbg-Size, and the RBG phase indicated by 1 by the bitmap, and data is transmitted on an RBG indicated by 1 according to the bitmap.

TABLE 5

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the UE is configured to use only resource type 1 through higher-layer signaling (605), some DCI for allocating a PDSCH to the UE has frequency-domain resource allocation information of $\lceil \log_2(N_{RB}^{DL,BWP}(N_{RB}^{DL,BWP}+1)/2) \rceil$ bits, a condition for which will be described later. Through this information, the base station can configure a starting virtual resource block (VRB) 620 and the length 625 of frequency-domain resources consecutively allocated therefrom.

When the UE is configured to use both resource type 0 and resource type 1 through higher-layer signaling (610), some DCIs for allocating a PDSCH to the UE has frequency-domain resource allocation information of bits of a maximum value 635 among a payload 615 for configuring resource type 0 and payloads 620 and 625 for configuring resource type 1, a condition for which will be described later. One bit may be added to the most significant bit (MSB) of the frequency-domain resource allocation information in the DCI, in which the bit equal to 0 may indicate that resource type 0 is used, and the bit equal to 1 may indicate that resource type 1 is used.

Figure 7:
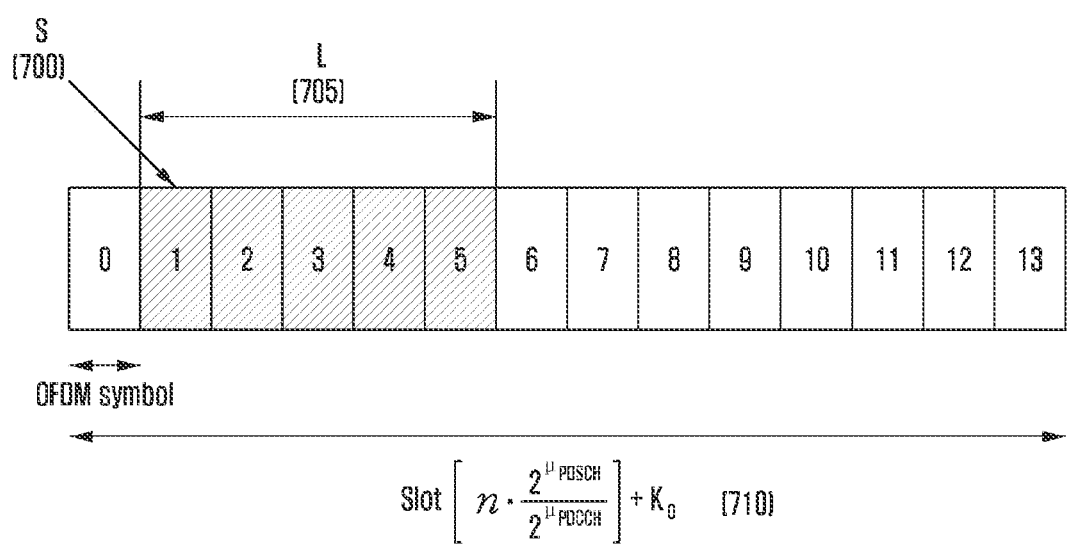
FIG. 7 illustrates a PDSCH time-domain resource allocation example in a wireless communication system according to an embodiment.

FIG. 7 illustrates a PDSCH time-domain resource allocation example in an NR wireless communication system according to an embodiment.

Referring to FIG. 7, a base station may indicate a time-domain position of a PDSCH resource 710 according to the start position 700 and the length 705 of an OFDM symbol in a slot dynamically indicated through the subcarrier spacing ($\mu_{PDSCH}$, $\mu_{PDCCH}$) of a data channel and a control channel configured using a higher layer, a scheduling offset ($K_0$) value, and DCI.

Figure 8:
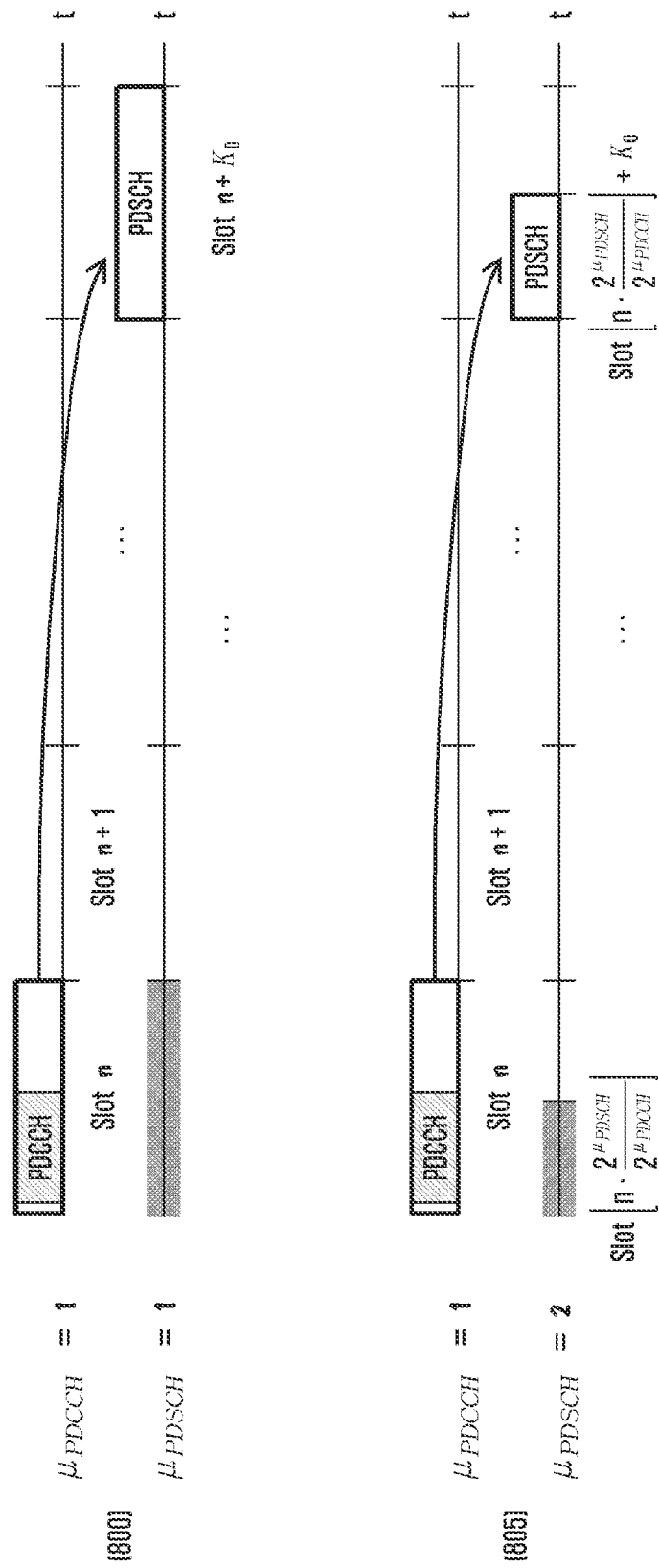
FIG. 8 illustrates a time-domain resource allocation example according to the subcarrier spacing of a data channel and the subcarrier spacing of a control channel in a wireless communication system according to an embodiment.

FIG. 8 illustrates a time-domain resource allocation example according to the subcarrier spacing of a data channel and the subcarrier spacing of a control channel in a wireless communication system according to an embodiment.

Referring to FIG. 8, when a data channel and a control channel have the same subcarrier spacing (800, $\mu_{PDSCH}=\mu_{PDCCH}$), since a data slot number and a control slot number are identical, a base station and a UE recognize that a scheduling offset occurs in accordance with predetermined slot offset $K_0$. When the subcarrier spacing of the data channel and the subcarrier spacing of the control channel are different (805, $\mu_{PDSCH}\neq\mu_{PDCCH}$), since a data slot number and a control slot number are different, the base station and the UE recognize that a scheduling offset occurs in accordance with predetermined slot offset $K_0$, based on the subcarrier spacing of the PDCCH.

In NR, for efficient control channel reception of a UE, various types of DCI formats as shown below in Table 6 are provided according to purposes.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |

TABLE 6-continued

| DCI format | Usage |
|---|---|
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

For example, the base station may use DCI format 1_0 or DCI format 1_1 to schedule a PDSCH for one cell.

DCI format 1_1 includes at least the following pieces of information when transmitted together with a CRC scrambled with a cell radio network temporary identifier (C-RNTI), a configured scheduling RNTI (CS-RNTI), or a new-RNTI.

Identifier for DCI formats (1 bit): DCI format indicator, which may—be set to 1.

Frequency domain resource assignment (NRBG bits or $\lceil \log_2(N_{RB}^{DL,BWP}(N_{RB}^{DL,BWP}+1)/2) \rceil$ bits): Indicates frequency-domain resource allocation. When DCI format 1_0 is monitored in a UE-specific search space, $N_{RB}^{DL,BWP}$ is the size of an active DL BWP; otherwise, $N_{RB}^{DL,BWP}$ is the size of an initial DL BWP. NRBG is the number of resource block groups. A detailed method is illustrated in the foregoing frequency-domain resource allocation.

Time domain resource assignment (0 to 4 bits): Indicates time-domain resource allocation according to the foregoing description.

VRB-to-PRB mapping (1 bit): 0 indicates non-interleaved VRP-to-PRB mapping, and 1 indicates interleaved VRP-to-PRB mapping.

MCS (5 bits): Indicates a modulation order and a coding rate used for PDSCH-transmission.

New data indicator (1 bit): Indicates whether a PDSCH corresponds to initial transmission or retransmission depending on toggling.

Redundancy version (2 bits): Indicates a redundancy version used for PDSCH-transmission.

HARQ process number (4 bits): Indicates an HARQ process number used for PDSCH-transmission.

Downlink assignment index (DAI) (2 bits): DAI indicator.

TPC command for scheduled PUCCH (2 bits): PUCCH power control indicator.

PUCCH resource indicator (3 bits): PUCCH resource indicator, which indicates one of eight resources configured via a higher layer.

PDSCH-to-HARQ_feedback timing indicator (3 bits): HARQ feedback timing indicator, which indicates one of eight feedback timing offsets configured via a higher layer.

DCI format 1_1 includes at least the following pieces of information when transmitted together with a CRC scrambled with a cell radio network temporary identifier (C-RNTI), a configured scheduling RNTI (CS-RNTI), or a new-RNTI.

Identifier for DCI formats (1 bit): DCI format indicator, which may be set to 1.

Carrier indicator (0 or 3 bits): Indicates a CC (or cell) in which a PDSCH allocated by DCI is transmitted.

Bandwidth part indicator (0, 1, or 2 bits): Indicates a BWP in which a PDSCH allocated by DCI is transmitted.

Frequency domain resource assignment (payload is determined according to the foregoing frequency-domain resource allocation): Indicates frequency-domain resource allocation. $N_{RB}^{DL,BWP}$ is the size of an active DL BWP. A detailed method is illustrated in the foregoing frequency-domain resource allocation.

Time domain resource assignment (0 to 4 bits): Indicates time-domain resource allocation according to the foregoing description.

VRB-to-PRB mapping (0 or 1 bit): 0 indicates non-interleaved VRP-to-PRB mapping, and 1 indicates interleaved VRP-to-PRB mapping. When frequency-domain resource allocation is set to resource type 0, this information is 0 bits.

PRB bundling size indicator (0 or 1 bit): When higher-layer parameter prb-BundlingType is not set 'or is' set to 'static', this information is 0 bits; when higher-layer parameter prb-BundlingType is set to 'dynamic', this information is 1 bit.

Rate matching indicator (0, 1, or 2 bits): Indicates a rate matching pattern.

ZP CSI-RS trigger (0, 1, or 2 bits): Indicator triggering an aperiodic ZP CSI-RS.

For transport block 1:

MCS (5 bits): Indicates a modulation order and a coding rate used for PDSCH-transmission.

New data indicator (NDI) (1 bit): Indicates whether a PDSCH corresponds to initial transmission or retransmission depending on toggling.

Redundancy version (RV) (2 bits): Indicates a redundancy version used for PDSCH transmission For transport block 2:

MCS (5 bits): Indicates a modulation order and a coding rate used for PDSCH-transmission.

NDI (1 bit): Indicates whether a PDSCH corresponds to initial transmission or retransmission depending on toggling.

RV (2 bits): Indicates a redundancy version used for PDSCH-transmission.

HARQ process number (4 bits): Indicates an HARQ process number used for PDSCH-transmission.

Downlink assignment index (0, 2, or 4 bits): DAI indicator.

TPC command for scheduled PUCCH (2 bits): PUCCH power control indicator.

PUCCH resource indicator (3 bits): PUCCH resource indicator, which indicates one of eight resources configured via a higher layer.

PDSCH-to-HARQ_feedback timing indicator (3 bits): HARQ feedback timing indicator, which indicates one of eight feedback timing offsets configured via a higher layer.

Antenna port (4, 5, or 6 bits): Indicates a DMRS port and a code division multiplexing (CDM) group without data.

TCI (0 or 3 bits): TCI indicator.

SRS request (2 or 3 bits): SRS transmission request indicator.

code block group (CBG) transmission information (0, 2, 4, 6, or 8 bits): Indicator indicating whether code block groups in an allocated PDSCH are transmitted. 0 indicates that the CBGs are not transmitted, and 1 indicates that the CBGs are transmitted.

CBG flushing-out information (0 or 1 bit): Indicator indicating whether previous CBGs are contaminated. 0 indicates that the CBGs may be contaminated, and 1 indicates that the CBGs may be combinable in retransmission reception.

DMRS sequence initialization (0 or 1 bit): DMRS scrambling ID selection indicator.

The number of pieces of DCI having different sizes that a UE can receive per slot in a cell is up to 4. The number of pieces of DCI having different sizes scrambled with a C-RNTI that a UE can receive per slot in a cell is up to 3.

The antenna port indication may be indicated through Table 7 to Table 10 below.

TABLE 7

| | One Codeword: Codeword 0 enabled, Codeword 1 disabled | |
|---|---|---|
| Value | Number of DMRS CDM group(s) without data | DMRS port(s) |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

In Table 7, Antenna port(s) (1000+DMRS port), dmrs-Type=1, maxLength=1 are shown.

TABLE 8

| One Codeword: Codeword 0 enabled, Codeword 1 disabled | | | | Two Codewords: Codeword 0 enabled Codeword 1 enabled | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

In Table 8, Antenna port(s) (1000+DMRS port), dmrs-Type=1, maxLength=2 are shown.

TABLE 9

| | One codeword: Codeword 0 enabled, Codeword 1 disabled | | | Two codewords: Codeword 0 enabled Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

In Table 9, Antenna port(s) (1000+DMRS port), dmrs-Type=2, maxLength=1 are shown.

TABLE 10

| | One codeword: Codeword 0 enabled, Codeword 1 disabled | | | | Two Codewords: Codeword 0 enabled Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |

TABLE 10-continued

| | One codeword: Codeword 0 enabled, Codeword 1 disabled | | | Two Codewords: Codeword 0 enabled Codeword 1 enabled | | |
|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

In Table 10, Antenna port(s) (1000+DMRS port), dmrs-Type=2, maxLength=2 are shown.

In Table 7 to Table 10, numbers 1, 2, and 3 indicated by Number of DMRS CDM group(s) without data refer to CDM groups {0}, {0, 1}, and {0, 1, 2}, respectively. The DMRS port(s) is arranged in order according to the index of a port used. An antenna port is indicated by DMRS port+1000. A CDM group of a DMRS is connected to a method for generating a DMRS sequence and an antenna port as illustrated in Table 11 and Table 12.

Table 11 below illustrates a parameter when dmrs-type=1 is used, and Table 12 below illustrates a parameter when dmrs-type=2 is used.

TABLE 11

| | CDM group | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 12

| | CDM group | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |

TABLE 12-continued

| | CDM group | | $w_f(k')$ | | $w_t(l')$ | |
|---|---|---|---|---|---|---|
| p | λ | Δ | k' = 0 | k' = 1 | l' = 0 | l' = 1 |
| 1010 | 2 | 4 | +1 | +1 | +1 | −1 |
| 1011 | 2 | 4 | +1 | −1 | +1 | −1 |

A DMRS sequence according to a parameter is determined by Equation (1) as follows.

$$a_{k,l}^{(p,\mu)} = \beta_{PDSCH}^{DMRS} w_f(k') w_t(l') r(2n + k') \quad (1)$$

$$k = \begin{cases} 4n + 2k' + \Delta & \text{Configuration type 1} \\ 4n + 2k' + \Delta & \text{Configuration type 2} \end{cases}$$

$$k' = 0, 1$$

$$l = \bar{l} + l'$$

$$n = 0, 1,$$

When only one codeword is enabled in Table 7 and Table 8, rows 2, 9, 10, 11, and 30 are used only for a single-user MIMO. That is, a UE may not assume that a different UE is co-scheduled and may not perform a multi-user MIMO reception operation, such as multi-user interference cancelation, nulling, or whitening.

When only one codeword is enabled in Table 9 and Table 10, rows 2, 10, and 23 are used only for a single-user MIMO. That is, a UE may not assume that a different UE is co-scheduled and may not perform a multi-user MIMO reception operation, such as multi-user interference cancellation, nulling, or whitening.

Figure 9:
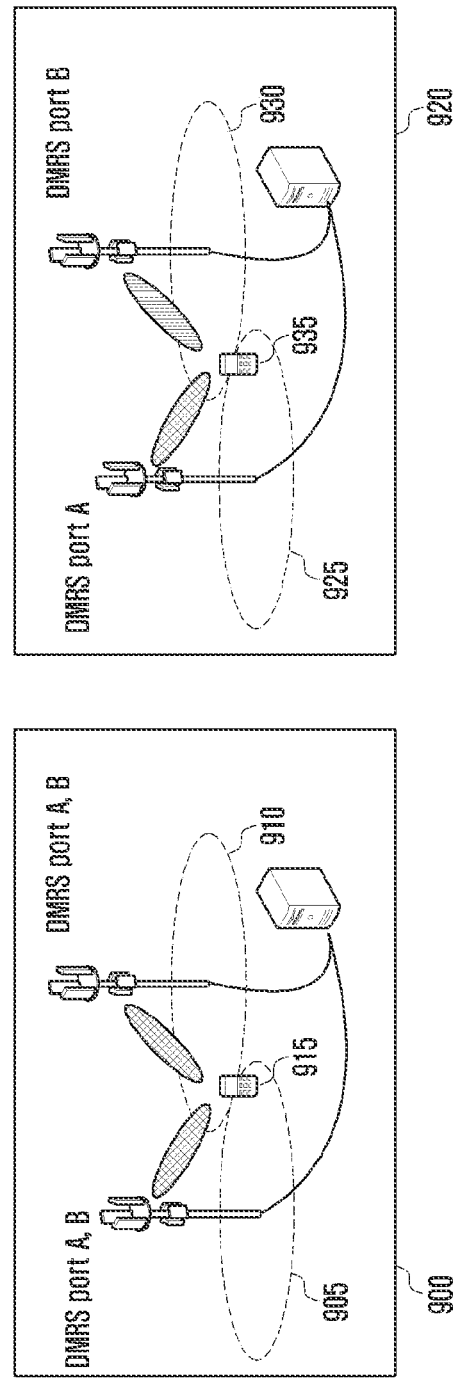
FIG. 9 illustrates a cooperative communication antenna port configuration according to an embodiment.

FIG. 9 illustrates a cooperative communication antenna port configuration according to an embodiment.

FIG. 9 shows radio resource allocation per TRP according to a joint transmission (JT) technique and a situation. In FIG. 9, 900 illustrates coherent joint transmission (C-JT) supporting coherent precoding between individual cells, TRPs, and/or beams. In C-JT, TRP A 905 and TRP B 910 transmit the same data (PDSCH), and a plurality of TRPs performs joint precoding, which indicates that TRP A 905 and TRP B 910 transmit the same DMRS ports (A and B) for receiving the same PDSCH. In this case, a UE 915 receives one piece of DCI for receiving one PDSCH demodulated by DMRS ports A and B.

In FIG. 9, 920 illustrates non-coherent joint transmission (NC-JT) supporting non-coherent precoding between individual cells, TRPs, and/or beams. In NC-JT, the individual cells, TRPs, and/or beams transmit different PDSCHs, and individual precoding may be applied to each data (or PDSCH), which indicates that TRP A 925 and TRP B 930 transmit different DMRS ports (e.g., TRP A 925 transmits DMRS port A and TRP B 930 transmits DMRS port B) for receiving the different PDSCHs. In this case, a UE 935 receives two types of DCI for receiving PDSCH A demodulated by DMRS port A and PDSCH B demodulated by DMRS port B.

To support NC-JT in which two or more transmission points simultaneously provide data to one UE, it is necessary to allocate PDSCHs transmitted from two or more different transmission points through a single PDCCH, or to allocate PDSCHs transmitted from two or more different transmission points through a plurality of PDCCHs. The UE may obtain a QCL relationship between reference signals or channels, based on L1/L2/L3 signaling and can efficiently estimate large scale parameters of the reference signals or channels through the QCL relationship. When a transmission point of a certain reference signal or channel is different, the large scale parameters are difficult to share, and thus the base station needs to simultaneously notify the UE of pieces of quasi co-location information about two or more transmission points through two or more TCI states when performing cooperative transmission. When non-coherent cooperative transmission is supported through a plurality of PDCCHs, that is, when two or more PDCCHs allocate two or more PDSCHs to the same serving cell and the same BWP simultaneously, two or more TCI states may be allocated to the respective PDSCHs and/or DMRS ports through the respective PDCCHs. However, when non-coherent cooperative transmission is supported through a single PDCCH, that is, when one PDCCH allocates two or more PDSCHs to the same serving cell and the same BWP simultaneously, the two or more TCI states need to be allocated to the respective PDSCHs and/or DMRS ports through the single PDCCH.

Assuming that DMRS ports allocated to a UE at a specific time are divided into a DMRS port group A transmitted from a transmission point A and a DMRS port group B transmitted from a transmission point B, two or more TCI states are connected to the respective DMRS port groups, and a channel may be estimated based on different QCL assumptions for the respective groups. The different DMRS ports may be subjected to CDM, FDM, or time domain multiplexing (TDM) in order to increase channel measurement accuracy and to reduce transmission load. When DMRS ports subjected to CDM are collectively referred to as a CDM group, since code-based multiplexing operates properly when the DMRS ports in the CDM group have similar channel characteristics and are easily distinguished by an orthogonal cover code (OCC), it is important to ensure that the DMRS ports in the same CDM group do not have different TCI states. The disclosure provides a method of indicating a DMRS port and a CDM group without data for satisfying the foregoing characteristics to a UE.

Hereinafter, for convenience of description, Table 7 to Table 12 are referred to as a "first antenna port indication (or conventional antenna port indication)", and a table in which some or all of code points in Table 7 to Table 12 are modified are referred to as a "second antenna port indication (new antenna port indication)". Allocation of a DMRS port and a CDM group without data is referred to as DMRS allocation.

The UE may determine the number of antenna ports used for PDSCH transmission through a table indicating a DMRS port. In DCI Format 1_1, a release 15 (Rel-15)-based antenna port indication method may be based on an index with a length of four to six bits indicated by an antenna port field in DCI, and accordingly an antenna port may be determined. The UE may identify information about the number and indices of DMRS ports for a PDSCH, the number of front-load symbols, and the number of CDM groups, based on an indicator (index) transmitted by the base station. In addition, the UE may determine a dynamic change in beamforming direction, based on information in a TCI field in DCI 1_1. When tci-PresentDCI is configured to 'enabled' in a higher layer, the UE may identify the TCI field of the three-bit information, thereby determining TCI states activated for a DL BWP or a scheduled component carrier and the direction of a beam associated with a DL-RS. When tci-PresentDCI is disabled, the UE may consider that there is no change in the direction of a beam in beamforming.

Herein, a scenario of allocating PDSCHs transmitted from two (or two or more) different transmission points through a single PDCCH is considered. An Rel-15 UE may receive a PDSCH stream including a single layer or a plurality of layers that is QCLed, based on TCI information and antenna port information in a single PDCCH. However, a release 16 (Rel-16) UE may receive data transmitted from a multi-TRP or a plurality of base stations in a C-JT/NC-JT format. To support C-JT/NC-JT, the Rel-16 UE needs basic higher-layer configuration. Specifically, for the higher-layer configuration, the UE needs a process of receiving and configuring a parameter or setting value related to C-JT/NC-JT.

Embodiment 1

A base station and a UE supporting C-JT/NC-JT disclose a separate DMRS port table for transmitting and receiving C-JT/NC-JT transmission signaling in a higher-layer configuration. The disclosed DMRS port table is divided into a DMRS port table indicated by an antenna port field indicated based on DCI format 1_1 and a separate table. As a method for distinguishing the DMRS port table from the DMRS port table in Rel-15, the base station and the UE may configure in advance information on whether to support NC-JT transmission in the RRC configuration. That is, in RRC, whether to support NC-JT transmission may be determined by a field, such as C-JT/NC-JT transmission=enabled/disabled.

A UE configured with C-JT/NC-JT transmission=enabled in a higher layer may indicate a field to be used by the UE by using an existing antenna port field in DCI format 1_1. Alternatively, the UE may indicate at least one piece of information among a detailed DMRS port number for NC-JT transmission, the number of DMRS CDM group(s) excluding data, the (maximum) number of front-loaded symbols, and a DMRS type using a separate field except for the antenna port field in DCI format 1_1.

Table 12-1 to Table 12-4 below disclose DMRS ports such that DMRS ports transmitted from the same TRP are transmitted to the same CDM group, based on the CDM group illustrated in Table 11. In Table 12-1 to Table 12-4, a semi-colon (;) is used to indicate that left and right DMRS ports are mapped to different TRP transmissions and different CDM groups, but the semi-colon may be omitted The DMRS ports illustrated in the tables show up to two DMRS ports being supported for a first TRP and a second TRP. In addition, concepts, such as the basic DMRS port, type, and number of front-loaded symbols illustrated in Table 7 to Table 10 may be equally applied.

As illustrated in Table 12-1, a DMRS port table for C-JT/NC-JT may support a different type of port separately from a port not supported in Rel-15. For example, when the base station indicates entry 0 to the UE, the UE may determine that DMRS port 0 and DMRS port 2 of the base station are transmitted from the first TRP and the second TRP, respectively. Upon identifying that the number of ports in each TRP is one, the UE may determine that single-layer transmission is performed from the first TRP and the second TRP. When the base station indicates entry 1 to the UE, the UE may determine that DMRS port 1 and DMRS port 3 of the base station are transmitted from the first TRP and the second TRP, respectively. Upon identifying that the number of ports in each TRP is one, the UE may determine that single-layer transmission is performed from the first TRP and the second TRP. Although entry 1 has a different port number from that of entry 0, entry 1 is functionally similar to entry 0 and may thus be omitted, considering entry 1 as overlapping entry 0.

When the base station indicates entry 2 to the UE, the UE may determine that the base station transmits DMRS ports 0 and 1 from the first TRP and DMRS port 2 from the second TRP. Upon identifying that the numbers of ports in the respective TRPs are two and one, the UE may determine that two-layer transmission is performed in the first TRP and one-layer transmission is performed in the second TRP. When the base station indicates entry 3 to the UE, the UE may determine that the base station transmits DMRS port 0 from the first TRP and DMRS ports 2 and 3 from the remaining one second TRP. Upon identifying that the numbers of ports in the respective TRPs are one and two, the UE may determine that single-layer transmission is performed in the first TRP and two-layer transmission is performed in the second TRP. The operations of the base station and the UE for entry 4 and entry 5 can be conveniently understood from the description of entry 2 and entry 3. Although entry 4 and entry 5 have different port numbers from those of entry 2 and entry 3, entry 4 and entry 5 are functionally similar and may thus be omitted.

When the base station indicates entry 6 to the UE, the UE may determine that the base station transmits DMRS ports 0 and 1 from the first TRP and DMRS ports 2 and 3 from the second TRP. Upon identifying that that the number of each port is two, the UE may determine that two-layer transmission is performed in the first TRP and two-layer transmission is performed in the remaining second TRP. Table 12-1 illustrates when the base station and the UE communicate in entry formats, and all or some of the seven entries may be applied to an actual system. Table 12-1 illustrates when the base station transmits one codeword to the UE and may be similarly applied to a case in which two or more codewords are transmitted.

Table 12-2 illustrates when maxLength=2 different from that in Table 12-1 in DMRS type 1 identical to that in Table 12-1. Referring to Table 7 to Table 8, in a DMRS port configuration for C-JT/NC-JT, DMRS ports from 0 to 3 may be mapped in the same form as in maxLength=1.

Table 12-3 is a DMRS port table for C-JT/NC-JT transmission in DMRS type 2 different from DMRS type 1 illustrated in Table 12-1. Table 12-3 supports up to 12 DMRS ports, which correspond to a structure suitable for a multi-user MIMO (MU-MIMO) type. For example, when the base station indicates entry 0 to the UE, the UE may determine that DMRS port 0 and DMRS port 2 of the base station are transmitted from the first TRP and the second TRP, respectively. Upon identifying the number of port in each TRP is one, the UE may determine that single-layer transmission is performed from the first TRP and the second TRP. Entries in Table 12-3 show when the number of DMRS CDM groups is 2 and when the number of DMRS CDM groups is 3 at once, not excluding a representation of the numbers of 2 and 3 in separate entries. The above embodiments are illustrated in entry formats, and some or all of the 14 entries may be applied to an actual system. For example, a table may be determined using only some entries 0, 2, 3, 6, 7, 9, 10, and 13 of the entries. In addition, the order of the entries above is an example and does not limit the disclosure. The above-described tables relate to when the base station transmits one codeword to the UE and may be similarly applied to when two or more codewords are transmitted.

Table 12-4 illustrates when maxLength=2 different from that in Table 12-3 in DMRS type 2 identical to. Referring back to Table 7 to Table 8, in a DMRS port configuration for C-JT/NC-JT, a total of two to four DMRS ports are allocated, and at least one DMRS port is allocated for each CDM group. According to the number of front-loaded symbols, when the number of front-loaded symbols is one, a DMRS port is allocated within DMRS ports 0 to 3 (same as Table 12-3 and thus omitted), and when the number of front-loaded symbols is two, a DMRS port is allocated within DMRS ports 0 to 7. When a total of two DMRS ports are used, the same frequency-domain OCC needs to be used for each CDM group. Time-domain OCCs of each CDM group may be the same or different. For example, in each of CDM groups {0, 1}, DMRS ports 0 and 2 using the same time-domain OCC may be used simultaneously, and DMRS ports 0 and 6 using different time-domain OCCs may also be used simultaneously. When a total of three or more DMRS ports are used, time-domain OCCs applied to each of CDM groups {0, 1} may be the same or different. The above embodiments are illustrated in entry formats, and some or all of the 28 entries may be applied to an actual system. For example, a table may be determined using only some entries 0, 2, 3, 6, 7, 9, 10, and 13 or 0, 2, 3, 6, 7, 9, 10, 13, 14, 16, 17, 20, 23, 24, and 27 of the entries. In addition, the order of the entries described above is an example and does not limit the disclosure. The above-described tables illustrate when the base station transmits one codeword to the UE and may be similarly applied to when two or more codewords are transmitted.

TABLE 12-1

| | One Codeword (dmrs-Type = 1, maxLength = 1) | | |
|---|---|---|---|
| Entries | Number of DMRS CDM group(s) without data | DMRS port(s) | Number of front-load symbols |
| 0 | 2 | 0; 2 | 1 |
| 1 | 2 | 1; 3 | 1 |
| 2 | 2 | 0, 1; 2 | 1 |
| 3 | 2 | 0; 2, 3 | 1 |
| 4 | 2 | 1; 2, 3 | 1 |
| 5 | 2 | 0, 1; 3 | 1 |
| 6 | 2 | 0, 1; 2, 3 | 1 |

In Table 12-1, a DMRS indication table for antenna port(s) (1000+DMRS port), dmrs-Type=1, maxLength=1 is shown.

TABLE 12-2

One Codeword (dmrs-Type = 1, maxLength = 2)

| Entries | Number of DMRS CDM group(s) without data | DMRS port(s) | Number of front-load symbols |
|---|---|---|---|
| 0 | 2 | 0; 2 | 2 |
| 1 | 2 | 1; 3 | 2 |
| 2 | 2 | 0, 1; 2 | 2 |
| 3 | 2 | 0; 2, 3 | 2 |
| 4 | 2 | 1; 2, 3 | 2 |
| 5 | 2 | 0, 1; 3 | 2 |
| 6 | 2 | 0, 1; 2, 3 | 2 |

In Table 12-2, a DMRS indication table for antenna port(s) (1000+DMRS port), dmrs-Type=1, maxLength=2 is shown.

TABLE 12-3

One Codeword (dmrs-Type = 2, maxLength = 1)

| Entries | Number of DMRS CDM group(s) without data | DMRS port(s) | Number of front-load symbols |
|---|---|---|---|
| 0 | 2 | 0; 2 | 1 |
| 1 | 2 | 1; 3 | 1 |
| 2 | 2 | 0, 1; 2 | 1 |
| 3 | 2 | 0; 2, 3 | 1 |
| 4 | 2 | 1; 2, 3 | 1 |
| 5 | 2 | 0, 1; 3 | 1 |
| 6 | 2 | 0, 1; 2, 3 | 1 |
| 7 | 3 | 0; 2 | 1 |
| 8 | 3 | 1; 3 | 1 |
| 9 | 3 | 0, 1; 2 | 1 |
| 10 | 3 | 0; 2, 3 | 1 |
| 11 | 3 | 1; 2, 3 | 1 |
| 12 | 3 | 0, 1; 3 | 1 |
| 13 | 3 | 0, 1; 2, 3 | 1 |

In Table 12-3, a DMRS indication table for antenna port(s) (1000+DMRS port), dmrs-Type=2, maxLength=1 is shown.

TABLE 12-4

One Codeword (dmrs-Type = 2, maxLength = 2)

| Entries | Number of DMRS CDM group(s) without data | DMRS port(s) | Number of front-load symbols |
|---|---|---|---|
| 0 | 2 | 0; 2 | 2 |
| 1 | 2 | 1; 3 | 2 |
| 2 | 2 | 0, 1; 2 | 2 |
| 3 | 2 | 0; 2, 3 | 2 |
| 4 | 2 | 1; 2, 3 | 2 |
| 5 | 2 | 0, 1; 3 | 2 |
| 6 | 2 | 0, 1; 2, 3 | 2 |
| 7 | 3 | 0; 2 | 2 |
| 8 | 3 | 1; 3 | 2 |
| 9 | 3 | 0, 1; 2 | 2 |
| 10 | 3 | 0; 2, 3 | 2 |
| 11 | 3 | 1; 2, 3 | 2 |
| 12 | 3 | 0, 1; 3 | 2 |
| 13 | 3 | 0, 1; 2, 3 | 2 |
| 14 | 2 | 6; 8 | 2 |
| 15 | 2 | 7; 9 | 2 |
| 16 | 2 | 6, 7; 8 | 2 |
| 17 | 2 | 6, 8; 9 | 2 |
| 18 | 2 | 7; 8, 9 | 2 |
| 19 | 2 | 6; 7, 9 | 2 |
| 20 | 2 | 6, 7; 8, 9 | 2 |
| 21 | 3 | 6; 8 | 2 |
| 22 | 3 | 7; 9 | 2 |
| 23 | 3 | 6, 7; 8 | 2 |
| 24 | 3 | 6, 8; 9 | 2 |
| 25 | 3 | 7; 8, 9 | 2 |
| 26 | 3 | 6; 7, 9 | 2 |
| 27 | 3 | 6, 7; 8, 9 | 2 |

In Table 12-4, a DMRS indication table for antenna port(s) (1000+DMRS port), dmrs-Type=2, maxLength=2 is shown.

Embodiment 2

Table 13-1 below discloses a method of using a code point of a reserved bit in existing Rel-15 as a method for a base station to indicate a DMRS port to a UE for C-JT/NC-JT transmission. As illustrated in Table 7, in the Rel-15 DMRS port table, fields 0 to 11 are occupied, and fields 12 to 15 are unoccupied as reserved bits. In the embodiment of the disclosure, as illustrated in Table 13-1, a DMRS port for cooperative transmission transmitted from two TRPs may be indicated using four code points 12 to 15 in a DMRS port table. When the same reserved bits are used, the base station and the UE do not need to allocate separate fields, thus efficiently using DCI resources.

For example, when the base station indicates entry 12 to the UE, the UE may determine that DMRS port 0 and DMRS port 2 of the base station are transmitted from a first TRP and a second TRP, respectively. Upon identifying that the number of ports in each TRP is one, the UE may determine that single-layer transmission is performed from the first TRP and the second TRP. Alternatively, when the base station indicates entry 13 to the UE, the UE may determine that DMRS ports 0 and 1 of the base station are transmitted from the first TRP and DMRS port 2 is transmitted from the second TRP. Upon identifying that the numbers of ports in the respective TRPs are two and one, the UE may determine that two-layer transmission is performed in the first TRP and one-layer transmission is performed in the second TRP. Alternatively, when the base station indicates entry 14 to the UE, the UE may determine that DMRS port 0 of the base station is transmitted from the first TRP and DMRS ports 2 and 3 are transmitted from the remaining one second TRP. Upon identifying that the numbers of ports in the respective TRPs are one and two, the UE may determine that single-layer transmission is performed in the first TRP and two-layer transmission is performed in the second TRP. Alternatively, when the base station indicates entry 15 to the UE, the UE may determine that DMRS ports 0 and 1 of the base station are transmitted from the first TRP and DMRS ports 2 and 3 are transmitted from the second TRP. Upon identifying that the numbers of ports in the respective TRPs are two, the UE may determine that two-layer transmission is performed in the first TRP and two-layer transmission is performed in the second TRP.

The UE configured with as C-JT/NC-JT transmission=enabled in a higher layer may identify a residual code point of an existing antenna port field in DCI format 1_1, thereby dynamically determining whether C-JT/NC-JT is performed. That is, when the antenna port field in DCI format 1_1 is 12 to 15, the UE may identify the number of TRPs used for PDSCH transmission scheduled by DCI, the number of layers to be transmitted, the number of DMRS DCM groups without data, the number of front-loaded symbols, and the like. The above embodiments are illustrated in entry formats, and some or all of the four entries may be applied to an actual system. The order of the entries may vary.

For example, Table 13-2, Table 113-3 and Table 13-4 below are embodiments of adding some of DMRS ports separately generated in Table 12-2, Table 12-3 and Table 12-4 to Table 8, Table 9 and Table 10 defined in Rel-15, in which overlapping DMRS ports are omitted to reduce a bit size. This omission is only one embodiment, and the tables may be completed additionally using some or all of the DMRS ports illustrates in Table 12-1 to Table 12-4. In addition, the base station may schedule joint transmission for the Rel-16 NC-JT terminal as illustrated in Table 12-1 to Table 13-4 and may simultaneously schedule single-port transmission for the Rel-15 UE on the same DMRS port, thereby performing a downlink MU-MIMO operation.

Alternatively, when DMRS port indices are identical in some entries of Table 13-1 to Table 13-4, the overlapping indices may be omitted. That is, in Table 13-1, port indices in entries 12, 13, and 15 for NC-JT transmission are identical as those in entries 11, 9, and 10 and may thus be omitted. In Table 13-2, port indices in entries 31, 32, and 34 for NC-JT transmission are identical as those in entries 11, 9, and 10 and may thus be omitted. In Table 13-3, port indices in entries 24, 25, 27, 29, and 31 for NC-JT transmission are identical as those in entries 23, 9, 10, 29, and 22 and may thus be omitted. In Table 13-3, port indices in entries 24, 25, 27, 29, and 31 for NC-JT transmission are identical as those in entries 23, 9, 10, 29, and 22 and may thus be omitted. In Table 13-4, port indices in entries 58, 59, 61, 63, and 65 for NC-JT transmission are identical as those in entries 23, 9, 10, 20, and 22 and may thus be omitted. When the indices are omitted, overlapping entries may be omitted based on one of the assumption that at least different CDM groups are not transmitted in the same port for NC-JT, the assumption that the UE can distinguish a DMRS port for NC-JT as a TCI field indicates whether to perform NC-JT, and the assumption that a DMRS port can be distinguished based on reception of a MAC CE message and reception of DCI.

TABLE 13-1

| | One Codeword: Codeword 0 enabled, Codeword 1 disabled | |
|---|---|---|
| Entry | Number of DMRS CDM group(s) without data | DMRS port(s) |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12 | 2 | 0; 2 |
| 13 | 2 | 0, 1; 2 |
| 14 | 2 | 0; 2, 3 |
| 15 | 2 | 0, 1; 2, 3 |

In Table 13-1, a DMRS indication table for antenna port(s) (1000+DMRS port), dmrs-Type=1, maxLength=1 is shown.

TABLE 13-2

| | One Codeword: Codeword 0 enabled, Codeword 1 disabled | | |
|---|---|---|---|
| Entry | Number of DMRS CDM group(s) without data | DMRS port(s) | Number of front-load symbols |
| 0 | 1 | 0 | 1 |
| 1 | 1 | 1 | 1 |
| 2 | 1 | 0, 1 | 1 |
| 3 | 2 | 0 | 1 |
| 4 | 2 | 1 | 1 |
| 5 | 2 | 2 | 1 |
| 6 | 2 | 3 | 1 |
| 7 | 2 | 0, 1 | 1 |
| 8 | 2 | 2, 3 | 1 |
| 9 | 2 | 0-2 | 1 |
| 10 | 2 | 0-3 | 1 |
| 11 | 2 | 0, 2 | 1 |
| 12 | 2 | 0 | 2 |
| 13 | 2 | 1 | 2 |
| 14 | 2 | 2 | 2 |
| 15 | 2 | 3 | 2 |
| 16 | 2 | 4 | 2 |
| 17 | 2 | 5 | 2 |
| 18 | 2 | 6 | 2 |
| 19 | 2 | 7 | 2 |
| 20 | 2 | 0, 1 | 2 |
| 21 | 2 | 2, 3 | 2 |
| 22 | 2 | 4, 5 | 2 |
| 23 | 2 | 6, 7 | 2 |
| 24 | 2 | 0, 4 | 2 |
| 25 | 2 | 2, 6 | 2 |
| 26 | 2 | 0, 1, 4 | 2 |
| 27 | 2 | 2, 3, 6 | 2 |
| 28 | 2 | 0, 1, 4, 5 | 2 |
| 29 | 2 | 2, 3, 6, 7 | 2 |
| 30 | 2 | 0, 2, 4, 6 | 2 |
| 31 | 2 | 0; 2 | 1 |
| 32 | 2 | 0, 1; 2 | 1 |
| 33 | 2 | 0; 2, 3 | 1 |
| 34 | 2 | 0, 1; 2, 3 | 1 |
| 35 | 2 | 0; 2 | 2 |
| 36 | 2 | 0, 1; 2 | 2 |
| 37 | 2 | 0; 2, 3 | 2 |
| 38 | 2 | 0, 1; 2, 3 | 2 |
| 39 | Reserved | Reserved | Reserved |

In Table 13-2, a DMRS indication table for antenna port(s) (1000+DMRS port), dmrs-Type=1, maxLength=2 is shown.

TABLE 13-3

| | One codeword: Codewond 0 enabled, Codeword 1 disabled | |
|---|---|---|
| Value | Number of DMRS CDM group(s) without data | DMRS port(s) |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 3 | 0 |

TABLE 13-3-continued

One codeword:
Codewond 0 enabled, Codeword 1 disabled

| Value | Number of DMRS CDM group(s) without data | DMRS port(s) |
|---|---|---|
| 12 | 3 | 1 |
| 13 | 3 | 2 |
| 14 | 3 | 3 |
| 15 | 3 | 4 |
| 16 | 3 | 5 |
| 17 | 3 | 0, 1 |
| 18 | 3 | 2, 3 |
| 19 | 3 | 4, 5 |
| 20 | 3 | 0-2 |
| 21 | 3 | 3-5 |
| 22 | 3 | 0-3 |
| 23 | 2 | 0, 2 |
| 24 | 2 | 0; 2 |
| 25 | 2 | 0, 1; 2 |
| 26 | 2 | 0; 2, 3 |
| 27 | 2 | 0, 1; 2, 3 |
| 28 | 3 | 0; 2 |
| 29 | 3 | 0, 1; 2 |
| 30 | 3 | 0; 2, 3 |
| 31 | 3 | 0, 1; 2, 3 |

In Table 13-3, a DMRS indication table for antenna port(s) (1000+DMRS port), dmrs-Type=2, maxLength=1 is shown.

TABLE 13-4

One codeword:
Codeword 0 enabled,
Codeword 1 disabled

| Value | Number of DMRS CDM group(s) without data | DMRS port(s) | Number of front-load symbols | Value | Number of DMRS CDM group(s) without data | DMRS port(s) | Number of front-load symbols |
|---|---|---|---|---|---|---|---|
| 0 | 1 | 0 | 1 | 48 | 1 | 0 | 2 |
| 1 | 1 | 1 | 1 | 49 | 1 | 1 | 2 |
| 2 | 1 | 0, 1 | 1 | 50 | 1 | 6 | 2 |
| 3 | 2 | 0 | 1 | 51 | 1 | 7 | 2 |
| 4 | 2 | 1 | 1 | 52 | 1 | 0, 1 | 2 |
| 5 | 2 | 2 | 1 | 53 | 1 | 6, 7 | 2 |
| 6 | 2 | 3 | 1 | 54 | 2 | 0, 1 | 2 |
| 7 | 2 | 0, 1 | 1 | 55 | 2 | 2, 3 | 2 |
| 8 | 2 | 2, 3 | 1 | 56 | 2 | 6, 7 | 2 |
| 9 | 2 | 0-2 | 1 | 57 | 2 | 8, 9 | 2 |
| 10 | 2 | 0-3 | 1 | 58 | 2 | 0; 2 | 1 |
| 11 | 3 | 0 | 1 | 59 | 2 | 0, 1; 2 | 1 |
| 12 | 3 | 1 | 1 | 60 | 2 | 0; 2, 3 | 1 |
| 13 | 3 | 2 | 1 | 61 | 2 | 0, 1; 2, 3 | 1 |
| 14 | 3 | 3 | 1 | 62 | 3 | 0; 2 | 1 |
| 15 | 3 | 4 | 1 | 63 | 3 | 0, 1; 2 | 1 |
| 16 | 3 | 5 | 1 | 64 | 3 | 0; 2, 3 | 1 |
| 17 | 3 | 0, 1 | 1 | 65 | 3 | 0, 1; 2, 3 | 1 |
| 18 | 3 | 2, 3 | 1 | 66 | 2 | 0, 2 | 2 |
| 19 | 3 | 4, 5 | 1 | 67 | 2 | 0, 1; 2 | 2 |
| 20 | 3 | 0-2 | 1 | 68 | 2 | 0; 2, 3 | 2 |
| 21 | 3 | 3-5 | 1 | 69 | 2 | 0, 1; 2, 3 | 2 |
| 22 | 3 | 0-3 | 1 | 70 | 3 | 0; 2 | 2 |
| 23 | 2 | 0, 2 | 1 | 71 | 3 | 0, 1; 2 | 2 |
| 24 | 3 | 0 | 2 | 72 | 3 | 0; 2, 3 | 2 |
| 25 | 3 | 1 | 2 | 73 | 3 | 0, 1; 2, 3 | 2 |
| 26 | 3 | 2 | 2 | 74-127 | reserved | reserved | reserved |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |

TABLE 13-4-continued

| | One codeword: Codeword 0 enabled, Codeword 1 disabled | | | | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |

In Table 13-4, a DMRS indication table for antenna port(s) (1000+DMRS port), dmrs-Type=2, maxLength=2 is shown.

The base station may allocate the UE at least two PDSCHs in A Single PDCCH for an eMBB or URLLC-based multi-TRP operation. The PDSCHs may be allocated not to overlap each other on the frequency axis within a single slot on the time axis. One PDSCH may be associated with one TCI state among TCI states configured by the base station for the UE. Further, a single/plurality of same DMRS port(s) may be associated with allocated resource so as not to overlap. In addition, one codeword (CW) indicated together with one redundancy version (RV) may be applied to all resources for the PDSCHs allocated by the base station. The UE may apply common RB mapping (mapping for each layer on a codeword side) to all allocated resources. In addition, CW indicated together with one redundancy version (RV) may be applied to individual resources not overlapping on the frequency axis among the PDSCH resources allocated by the base station. RVs applied to the respective PDSCH resources may be the same or different. An application of the RVs may be transmitted by the UE to the base station as a UE capability of the UE. In addition, the UE may transmit a soft combining competence of a received codeword to the base station via a UE capability message. First, for NC-JT transmission, each TRP and the UE support transmission of up to two layers, in which up to two codeblocks may be transmitted for each CW in single-layer transmission, and one codeblock may be transmitted for each CW in two-layer transmission. The same MCS or different MCSs may be applied to the PDSCH resources allocated not to overlap each other on the frequency axis.

The base station may allocate the UE at least two PDSCHs in A Single PDCCH for an eMBB or URLLC-based multi-TRP operation. The PDSCHs may include resources allocated not to overlap each other within a single slot on the time axis. When the base station transmits one CW (one transport block (TB)), one transmission configuration indication (TCI) and one RV may be applied. In addition, the same MCS may be applied to all PDSCHs transmitted via at least one DMRS port within a single slot. The foregoing description within the single slot may be applied to PDSCH resources allocated by the base station to different slots.

The UE may support data transmitted from a multi-TRP or a plurality of base stations in the form of C-JT/NC-JT. The UE supporting C-JT/NC-JT may receive a parameter or setting value related to C-JT/NC-JT in a higher-layer configuration and may set an RRC parameter of the UE, based on the parameter or setting value. For the higher-layer configuration, the UE may use a UE capability parameter tci-StatePDSCH. When determining to transmit one CW through data scheduling, the base station may indicate one to four layers to the UE to transmit one TB mapped to the one CW. This case corresponds to cases where maxLength=1 illustrated in Table 7, Table 8, Table 12, Table 12-1 to Table 12-4, and Table 13-1 to Table 13-4. When determining to transmit two CWs through data scheduling, the base station may indicate five to eight layers to the UE to transmit two TBs mapped to the two CWs. This case corresponds to cases where maxLength=2 illustrated in Table 7, Table 8, Table 12, Table 12-1 to Table 12-4, and Table 13-1 to Table 13-4.

Various embodiments of the disclosure propose retransmission (secondary transmission) after initial transmission (first transmission) when a base station transmits two CWs. The base station may indicate transmission of two CWs using a single downlink control channel (first PDCCH) in TRP A or TRP B in order to transmit data to a specific UE. Detailed scheduling information of DCI format 1_1 of the first PDCCH may include a HARQ process number, an antenna port, and CBG transmission information, which are commonly applied to data regardless of the number of TBs, and may include an MCS, an NDI, and an RV separately for each TB.

Figure 10:
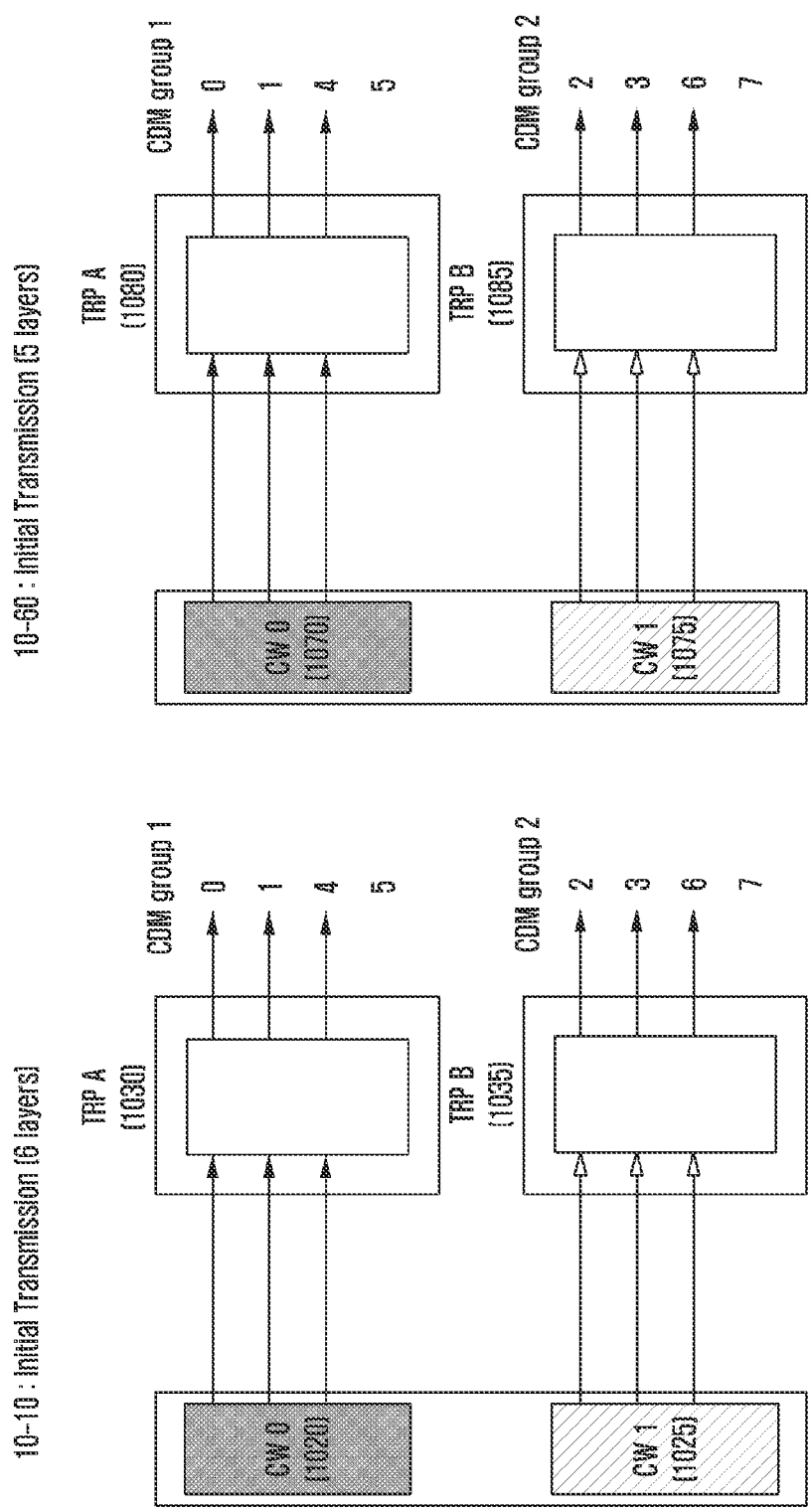
FIG. 10 illustrates cooperative communication based on two codewords according to an embodiment.

FIG. 10 illustrates cooperative communication based on two codewords according to an embodiment.

Referring to FIG. 10, 10-10 shows a case where a base station maps CW 0 1020 and CW 1 1025 to six layers to transmit data to a specific UE, and case 10-60 shows a case where the base station maps CW 0 1070 and CW 1 1075 to five layers to transmit data to the specific UE. However, when the base station determines a TB for data transmission to the specific UE as in case 10-10 and determines to transmit data to the UE using a total of six layers, the base station indicates transmission of three layers by the TRP A 1030 and transmission of three layers by TRP B 1035. DMRS port mapping through an antenna port indicator in the TRP A 1030 and the TRP B 1035 may be configured in various forms, but this embodiment illustrates when a DMRS port table is mapped by each port indicator and the mapped DMRS port table is discriminatively generated considering the same CDM group. That is, DMRS port table indices 0, 1, 4, and 5 may be generated as the same CDM group 1, and DMRS port table indices 2, 3, 6, and 7 may be generated as another same CDM group 2. DMRS ports of CDM group 1 may be mapped to TRP A 1030, and DMRS ports of CDM group 2 may be mapped to TRP B 1035. The order and mapping of the DMRS indices in this embodiment are only for illustration and are not limited to a different method.

Alternatively, when the base station determines a TB for data transmission to the specific UE as in case 10-60 and determines to transmit data to the UE using a total of five layers, the base station may indicate transmission of two layers by TRP A 1080 and transmission of three layers in TRP B 1085. DMRS port mapping in TRP A 1080 and TRP B 1085 enables TRP A 1080 to perform transmission using DMRS ports 0 and 1 and enables TRP B 1085 to perform transmission using DMRS ports 2, 3, and 6 in consideration of the same CDM group. That is, regarding layers added after the five layers, a layer for CW 1 1075 may be added first, and then a layer for CW 0 1070 may be added. Although FIG. 10 shows transmission of five layers and transmission of six layers among cases where the base station transmits two CWs, additional cases including transmission of seven layers and transmission of eight layers are not excluded but may be easily inferred by extending the above description of the transmission of five layers and the transmission of six layers.

The UE may transmit acknowledgement/non-acknowledgement (ACK/NACK) information indicating whether CW 0 (mapped to TB 1) 1020 and 1070 and CW 1 (mapped to TB 2) 1025 and 1075 transmitted from TRP A 1030 and 1080 and TRP B 1035 and 1085 are successfully received to the base station through a PUCCH or PUSCH resource allocated by the base station. In response to TB 1 and TB 2, each piece of ACK/NACK information may be transmitted in TB units or in units of a plurality of CBGs, which are sets of CBs, depending on whether a CBG is configured. When a CBG retransmission operation is configured by the base station, the UE may designate and indicate a CBG to be retransmitted in retransmission to the base station using CBG transmission information of DCI format 1_1. Specifically, when the CBG transmission information is zero bits, it may be assumed that the CBG is initially transmitted or retransmitted in the form of a TB. When the CBG transmission information is N (N=2, 4, 6, 8) bits, the CBG transmission information may sequentially indicate a CBG to be retransmitted among N CBGs as 1 and a CBG not to be retransmitted as 0 and may indicate that the corresponding CBG is retransmitted.

As illustrated in FIG. 10, the base station may map the two CWs 1020, 1025, 1070, and 1075 to TRP A 1030 and 1080 and TRP B 1035 and 1085 for the UE and may transmit data including TB 1 and TB 2 mapped to CW 0 1020 and 1070 and CW 1 1025 and 1075. The UE may successfully receive both TB 1 and TB 2 or may fail to receive at least one of TB 1 and TB 2 according to the result of receiving the data.

Figure 11:
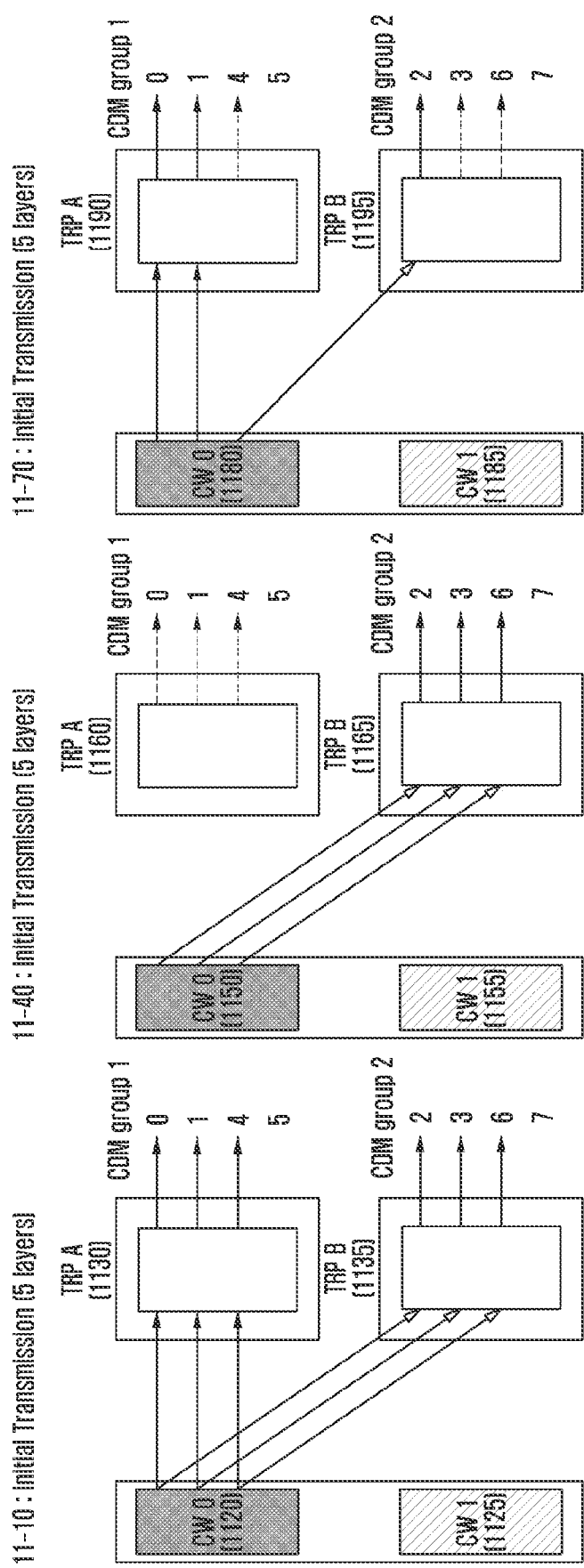
FIG. 11 illustrates cooperative communication based on two codewords according to another embodiment.

FIG. 11 illustrates cooperative communication based on two codewords according to another embodiment.

In FIG. 11, various methods show a base station retransmitting one TB (e.g., CW 0, TB 1) when a UE fails to receive the TB as described above. Case 11-10 shows a method in which a UE transmits the result of successfully receiving TB 2 and failing to receive TB 1 to a base station and the base station transmits CW 0 1120 to the UE using both TRP A 1130 and TRP B 1135 TB 1, based on the result, in order to retransmit. When CW 0 1120 is repeatedly transmitted from TRP A 1130 and TRP B 1135, the UE may guarantee the highest reception performance in consideration of a channel state or a spatial channel state according to beamforming. In particular, when an additional coding gain is obtained in TRP A 1130 and TRP B 1135, the UE may maximize a reception success probability. It is assumed that TRP A 1130 transmits a single downlink control channel in both initial transmission and retransmission. However, the disclosure is not limited thereto, and TRP B 1135 may transmit a single downlink control channel in both initial transmission and retransmission, or TRP A 1130 may transmit a single downlink control channel in initial transmission and TRP B 1135 having succeeded in reception may transmit a single downlink control channel in retransmission. Alternatively, TRP A 1130 and TRP B 1135 may transmit a corresponding downlink control channel in both initial transmission and retransmission, or multiple downlink control channels may be transmitted in initial transmission and TRP B 1135 having succeeded in reception may transmit a single downlink control channel in retransmission Case 11-10 shows a method of indicating repeated transmission of the same CW 0 1120 from TRP A 1130 and TRP B 1135 to the UE in retransmission after initial transmission. The base station may configure some control information of DCI format 1_1 in a first PDCCH as follows.

Embodiment 1-1

When CBG transmission information (CBGTI) is configured in DCI transmitted by the base station without changing a HARQ process number in retransmission after initial transmission, a CBG corresponding to TB 1 is transmitted, and thus only part of a retransmitted CBG is transmitted as 1. For example, when TB 1 includes two CBGs and TB 2 includes two CBGs, a CBGTI field includes four bits. When the two CBGs of TB 1 are retransmitted, a CBGTI code point may be indicated as 1100, and when a first CBG of the CBGs of TB 1 is retransmitted, the CBGTI code point may be indicated as 1000.

The base station may provide the UE with layers used for retransmission and DMRS antenna port information corresponding thereto in an antenna port field in the DCI. For example, the base station may indicate to the UE a code point including DMRS port indices 0, 1, and 4 and additionally DMRS port indices 2, 3, and 6 in the antenna port field (four to six bits). The antenna port field may be configured in various sets or pairs including 0, 1, 2, 3, 4, and 6 in an associated manner according to the configuration of a DMRS port table. Alternatively, the base station may indicate only DMRS port indices 0, 1, and 4 or DMRS port indices 2, 3, and 6 in the antenna port field (four to six bits). That is, when three pieces of layer-related information (e.g., including DMRS port indices 0, 1, and 4) are indicated according to the configuration of a DMRS port table, transmission of all of DMRS port indices 0, 1, 2, 3, 4, and 6 is implicitly indicated and the UE may implicitly determine a transmitted antenna port.

In an MCS of TB 1 in the DCI, the base station may indicate to the UE the same code point as the MCS of TB 1 used for initial transmission according to scheduling by the base station in retransmission due to failure of the initial transmission or may change a code point of an MCS according to resource allocation and a channel change. However, the base station may indicate a reserved code (#29 to #31) for an MCS for TB 2 in the DCI. When the base station transmits the reserved code, the UE may receive reserved code information in the MCS for TB 2 and may implicitly determine that TB 1 is retransmitted in a DMRS port for TB 2, based on this value. For example, when the MCS for TB 2 is one value (e.g., #29) of the reserved code points, it may be determined that an MCS transmitted from TRP B 1135 is identical to the MCS of TB 1 retransmitted from TRP A 1130. Alternatively, when the MCS for TB 2 is one value (e.g., #30) of the reserved code points, it may be determined that the MCS from TRP B 1135 is identical to the MCS of TB 2 initially transmitted from TRP B 1135.

The base station may indicate the same NDI code point value for TB 1 without toggling the NDI code point value in response to the UE failing to receive TB 1. Since the UE has successfully received TB 2 in the initial transmission, when TRP B 1135 repeatedly transmits TB 1, an NDI code point value for TB 2 may be indicated as a toggled value.

In addition, the base station may transmit an RV code point of TB 1 in the DCI as 0 and an RV code point of TB 2 as 0 or 3 in consideration of a soft combining gain of TB 1 retransmitted from TRP A 1130 on the UE side and TB 1 transmitted from TRP B 1135. On the contrary, the base station may transmit the RV code point of TB 1 as 3 and the RV code point of TB 2 as 0. In the initial transmission, when part of a CBG is successfully received (CBG flushing-out information=1), the base station may transmit the RV code point of TB 1 as 2 and the RV code point of TB 2 as 3.

That is, the UE may determine repeated transmission of case 11-10, based on at least the DMRS port explicitly indicated in the antenna port field and the reserved code point information of the MCS field for TB2.

Embodiment 1-2

Embodiment 1-2 is a method of performing repeated transmission from TRP A 1130 and TRP B 1135 by assuming that a HARQ process number, an antenna port field, and an RV in DCI format 1_1 of a PDCCH are identical as in case 11-10 and by changing MCS, NDI, and CBGTI code point values.

When initial transmission fails as in case 11-10, the base station may flexibly indicate an MCS (0 to 28) of TB 1 transmitted from TRP A 1130 and an MCS (0 to 28) of TB 2 transmitted from TRP B 1135 to the UE in consideration of a TB size and a channel state. When a dynamically changeable MCS field is indicated, the UE cannot identify whether data for TB 2 transmitted from TRP B 1135 is mapped to CW 0 or CW 1 only with an indicated DMRS port index.

In order to distinguish the data, an NDI field existing for each TB in DCI is used. An NDI is used to determine whether new data is transmitted in TB units. When a received NDI value is toggled from 0 to 1 and 1 to 0, the UE determines that new data is received, and when the received NDI value is not toggled from 0 to 0 and 1 to 1, the UE determines that previous data is retransmitted. For example, the base station may indicate the same NDI code point value for TB 1 without toggling the NDI code point value in response to the UE failing to receive TB 1. Since the UE has successfully received TB 2 in the initial transmission, when TRP B 1135 repeatedly transmits TB 1, the base station may indicate an NDI code point value for TB 2 as a toggled value. Alternatively, when the base station identifies HARQ ACK/NACK information received from the UE and identifies that transmission of at least one of TB 1 and TB 2 has failed, the base station may not toggle NDI 1 and NDI 2 but may indicate the same values as transmitted in the initial transmission. Ultimately, the UE may determine that TB 1, which the UE has failed to receive, is repeatedly transmitted from TRP A 1130 and TRP B 1135 considering the result of the initial transmission from the base station (HARQ ACK/NACK information transmitted to the base station).

Alternatively, when CBG retransmission is configured by the base station in addition to the NDI information and two CBGs are configured for each TB, the base station may indicate a CBGTI field as 1100, 1000, and 0100 in order to indicate retransmission of TB1 to the UE. The UE may determine that TB 1 is retransmitted and TB 2 is not retransmitted, based on NDI 1 and NDI 2, which are not toggled, and CBGTI (e.g., 1100).

In addition, when the base station determines that soft combining of TB 1 initially transmitted from TRP A 1130 and TB 1 retransmitted is impossible or unnecessary according to a HARQ ACK/NACK message transmitted by the UE, the base station may perform retransmission by fixing all NDIs or by indicating CBG flushing-out information (CGBFI) as a value of 0. In addition, when the base station cannot identify a NACK response transmitted by the UE or an ACK response of the UE, if transmission of TB 1 or TB 2 fails, the base station may indicate the same values of NDI code points of TB 1 and TB 2 without toggling the NDI code points.

That is, the UE may determine repeated transmission of case 11-10, based on at least the result of the initial transmission and whether the value of the NDI field is toggled or the indicated CBGTI value.

Case 11-40 shows a method of transmitting CW 0 1150 using one TRP B 1165 to retransmit TB 1 when the UE successfully receives TB 2 (CW1 1155) and fails to receive TB 1 (CW 0 1150). The base station maps CW 0 1150 to TRP B 1165 and repeatedly transmits CW 0 1150 to avoid a channel in which the initial transmission has failed and use a channel in which the initial transmission has succeeded when transmitting the CW 0 1150. It is assumed that a single downlink control channel is transmitted from the TRP A 1160 or the TRP B 1165 in both the initial transmission and the retransmission. However, the disclosure is not limited to this illustration. Case 11-40 illustrates a method in which the base station indicates data (TB 1) to be transmitted in the retransmission after the initial transmission to the UE by changing from TRP A 1160 (DMRS antenna ports: 0, 1, and 4) to TRP B 1165 (DMRS antenna ports 2, 3, and 6), in which the base station may configure some control information of DCI format 1_1 in the first PDCCH as follows.

Embodiment 2

When CBGTI is configured in DCI transmitted by the base station without changing a HARQ process number in retransmission after initial transmission, a CBG corresponding to TB 1 is transmitted, and thus only part of a retransmitted CBG is transmitted as 1. For example, when TB 1 includes two CBGs and TB 2 includes two CBGs, a CBGTI field includes four bits. When the two CBGs of TB 1 are retransmitted, a CBGTI code point may be indicated as 1100, and when a second CBG of the CBGs of TB 1 is retransmitted, the CBGTI code point may be indicated as 0100.

The base station may indicate to the UE a code point including DMRS port indices 2, 3, and 6 in an antenna port field (four to six bits). The antenna port field may be configured in various sets or pairs including 2, 3, and 6 in an associated manner according to the configuration of a DMRS port table. Alternatively, the base station may repeatedly indicate the same antenna port field used for initial transmission in retransmission. That is, a code point including DMRS port indices 0, 1, and 4 and DMRS port indices 2, 3, and 6 may be indicated. The antenna port field may be configured in various sets or pairs including 0, 1, 2, 3, 4, and 6 in an associated manner according to the configuration of a DMRS port table. When the base station indicates the same antenna port as in the initial transmission, the UE may determine a valid DMRS port actually transmitted only after additionally identifying MCS, NDI, and RV fields of TB 1 or TB 2.

The MCS of TB 1 in DCI indicates a code point of an appropriate MCS in consideration of resource allocation by the base station and a channel between the base station and the UE, whereas for example, the base station may zero-pad the MCS field (five bits), RV field (two bits), and NDI (one bit) fields of TB 2. Alternatively, the base station may indicate one code point (e.g., #31) among MCS reserved bits (#29 to #31) of TB 2, thereby indicating that TB 2 mapped to CW 1 1155 is not transmitted from TRP A 1160. Alternatively, the base station may indicate the MCS code point of TB 2 as #26 (alternatively, #25 to #28) and the RV as 1 (alternatively, 3), thereby indicating to the UE that a configuration for TB 2 is disabled and thus transmission of TB 2 is not performed. Specifically, when a higher-layer parameter maxNrofCodeWordsScheduled-ByDCI is configured to 2 (two CW-enabled case), the base station may disable the configuration by indicating the MCS of TB 2 as 26 and the RV as 1, so that the UE receiving the MCS and RV information may determine that only TB 1 is transmitted.

An NDI code point value of TB 1 in the DCI may indicate the same value as in the initial transmission since the same data as in the initial transmission is transmitted. However, since an NDI code point value of TB 2 does not significantly affect the UE's determination, the base station may indicate the NDI code point value with or without toggling.

In addition, the base station may transmit the RV code point of TB 2 as 0 or 3 in consideration of a soft combining gain of TB 1 retransmitted from TRP A 1160 in the initial transmission and TB 1 transmitted from TRP B 1165 in the retransmission.

That is, the UE may determine repeated transmission of case 11-40 based on at least the DMRS port explicitly indicated in the antenna port field and the code point of the MCS field for TB 2 that is not transmitted.

Although the embodiment shows that the base station indicates data transmission for CW 0 1150 to TRP B 1165, that is, DMRS port indices 2, 3, and 6, it is possible to adequately infer indication to TRP A 1160, that is, the DMRS port index 0, 1, and 4, based on the above to simplify implementation rather than performance.

Case 11-70 shows a method of transmitting CW 0 using two TRPs of TRP A 1190 and TRP B 1195 to retransmit TB 1 when the UE successfully receives TB 2 and fails to receive TB 1. This embodiment discloses a method of using two TRPs (TRP A 1190 and TRP B 1195) for retransmitting CW 0 to perform retransmission within the scope of a restriction that only up to four layers can be transmitted to transmit CW 0 as in Embodiment 1 and following an ordering sequence in mapping of an antenna port and a layer by the base station. It is assumed that a single downlink control channel is transmitted from the TRP A 1190 or the TRP B 1195 in both the initial transmission and the retransmission. However, the disclosure is not limited to this illustration. Case 11-70 illustrates a method in which the base station indicates retransmission using NC-JT based on TRP A 1190 or the TRP B 1195 to the UE in the retransmission after the initial transmission, in which the base station may configure some control information of DCI format 1_1 in the first PDCCH as follows.

Embodiment 3

When the base station configures CBGTI in DCI transmitted by the base station without changing a HARQ process number in retransmission after initial transmission, a CBG corresponding to TB 1 is transmitted, and thus only part of a retransmitted CBG is transmitted as 1. For example, when TB 1 includes two CBGs and TB 2 includes two CBGs, a CBGTI field includes four bits. Specifically, when the two CBGs of TB 1 are retransmitted, a CBGTI code point may be indicated as 1100, and when a first CBG of the CBGs of TB 1 is retransmitted, the CBGTI code point may be indicated as 1000.

In addition, for example, the base station may indicate to the UE a code point including DMRS port indices 0, 1, and 3 in an antenna port field (four to six bits) in DCI. The antenna port field may be configured in various sets or pairs including DMRS port indices 0, 1, and 3 in an associated manner according to the configuration of a DMRS port table. Specifically, this embodiment follows a mapping order of Rel-15 and indicates that the highest three port indices of port indices are sequentially included based on a DMRS port table of initial transmission.

Alternatively, in case 11-70, only one layer in CW 0 1180 may be mapped to DMRS port index 0 through TRP A 1190, and two layers in CW 0 1180 may be mapped to DMRS port indices 2 and 3 through TRP B 1195. When the port mapping (DMRS port indices 0, 2, and 3) illustrated in this embodiment may include indices 0, 2, and 3 in a two-CW DMRS table based on NC-JT agreed between the base station and the UE or included sets (or pairs) are configured in an associated manner, the base station may perform a flexible layer mapping operation for the UE.

The MCS of TB 1 indicates a code point of an appropriate MCS in consideration of resource allocation by the base station and a channel between the base station and the UE, whereas the base station may zero-pad the MCS field (five bits), RV field (two bits), and NDI (one bit) fields of TB 2. Alternatively, the base station may indicate one code point (e.g., #31) among MCS reserved bits (#29 to #31) of TB 2, thereby indicating that TB 2 mapped to CW 1 1185 is not transmitted from TRP A 1190. Alternatively, the base station may indicate the MCS code point of TB 2 as #26 (alternatively, #25 to #28) and the RV as 1 (alternatively, 3), thereby indicating to the UE that a configuration for TB 2 is disabled and thus transmission of TB 2 is not performed. Specifically, when a higher-layer parameter maxNrofCodeWordsScheduledByDCI is configured to 2 (two CW-enabled case), the base station may disable the configuration by indicating the MCS of TB 2 as 26 and the RV as 1, so that the UE receiving the MCS and RV information may determine that only TB 1 is transmitted.

An NDI code point value of TB 1 may indicate the same value as in the initial transmission since the same data as in the initial transmission is transmitted. However, since an NDI code point value of TB 2 does not significantly affect the UE's determination, the base station may indicate the NDI code point value with or without toggling.

The base station may transmit the RV code point of TB 2 as 0 or 3 in consideration of a soft combining gain of TB 1 retransmitted from TRP A 11-90 in the initial transmission and TB 1 transmitted from TRP B 1195 in the retransmission.

That is, the UE may determine repeated transmission of x+1_3 based on at least the DMRS port explicitly indicated in the antenna port field and the code point of the MCS field for TB 2 that is not transmitted.

Although the above embodiments consider a scenario in which the base station retransmits TB 1, it is possible to adequately infer a case of retransmitting TB 2 when the UE successfully receives TB 1 and fails to receive TB 2 in initial transmission from the above embodiments (vice versa).

Figure 12:
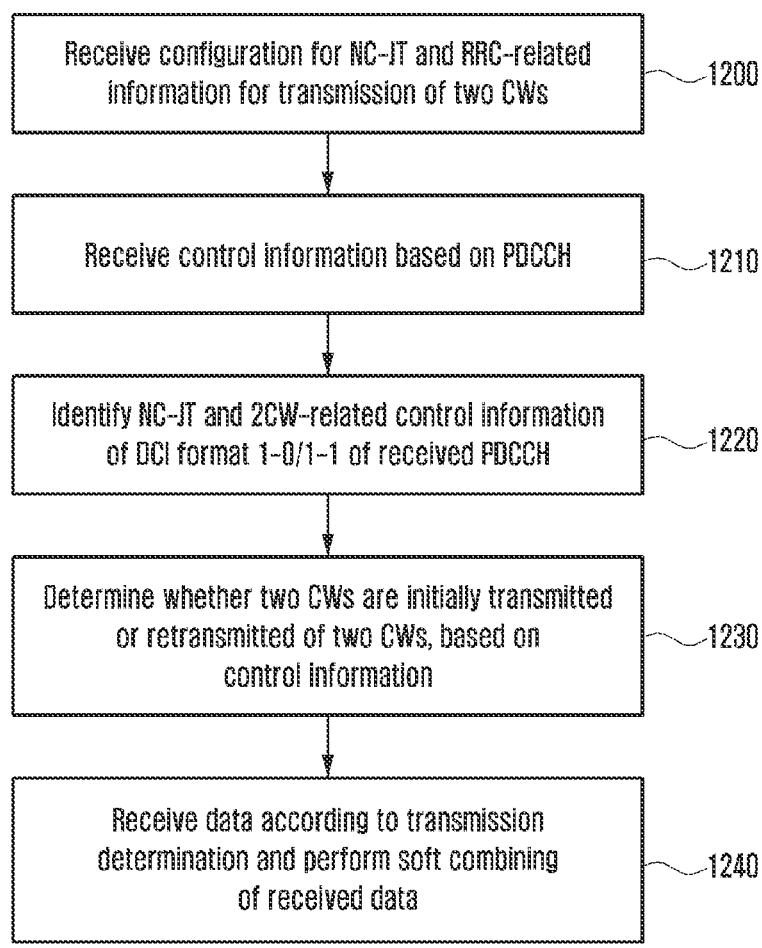
FIG. 12 illustrates cooperative communication based on two codewords according to another embodiment.

FIG. 12 illustrates cooperative communication based on two CWs according to an embodiment.

FIG. 12 illustrates the operation of the UE illustrated in Embodiments 1 to 3 described in connection with FIG. 11.

In step 1200, the UE may receive a configuration for NC-JT and RRC-related information for transmission of two CWs (two TBs) by a base station.

In step 1210, the UE may receive at least one PDCCH transmitted from TRP A or TRP B, and in step 1220, the UE may identify related control information.

The control information is information indicated in DCI format 1_1 of the PDCCH and may include at least an antenna port indicator for NC-JT a HARQ process number, and CBGTI, which are commonly applied to TB 1 and TB 2, and an MCS, an RV, and an NDI, which are applied for each TB.

In step 1230, the UE may determine whether one TB (TB 1 or TB 2) is transmitted or a plurality of TBs (TB 1 and TB 2) is transmitted, based on the control information. In step 1240, the UE determines whether the transmission is initial transmission (first transmission) or retransmission (secondary transmission), based on some of the control information, may store data transmitted from the one or the plurality of TRPs (TRP A and/or TRP B), and may perform a decoding operation or a soft combining operation. Specifically, in the soft combining operation, when the two CWs are first transmitted, the UE may obtain a decoding gain between TRP A and TRP B within the same-order transmission (if possible). In retransmission, the UE may determine whether to obtain a decoding gain between the first transmission and the secondary transmission, whether to obtain a decoding gain between TRP A and TRP B within the same-order transmission, or whether to obtain the above two decoding gains with respect to the two CWs.

As described above, in consideration of single PDCCH-based NC-JT, the UE receives one PDCCH for NC-JT from TRP A or TRP B and receives TB 1 and TB 2 from the plurality of TRPs, based on the PDCCH. However, the UE may receive one PDCCH for NC-JT from each of TRP A and TRP B (receive a multi-PDCCH) and may receive data from the plurality of TRPs based on the PDCCHs. In this case, the UE may be able to receive a plurality of TBs or may be restricted from receiving a plurality of TBs according to conditions of resources of a first PDSCH(s) and a second PDSCH(s) to which the data is allocated.

For example, when the first PDSCH(s) transmitted from TRP A and the second PDSCH(s) transmitted from TRP B are allocated to at least some overlapping symbols (e.g., symbols 1 and symbols 2,) in the same slot, the UE may not expect to receive TB 1 and TB 2 transmitted on the first PDSCH(s) and TB 1' and TB 2' transmitted on the second PDSCH(s) from the base station. Alternatively, the UE may receive TB 1 and TB 2 transmitted on the first PDSCH(s) and TB 1' and TB 2' transmitted on the second PDSCH(s) according to a UE capability of the UE. Alternatively, the UE may selectively receive the first PDSCH or the second PDSCH among TB 1 and TB 2 transmitted on the first PDSCH(s) and TB 1' and TB 2' transmitted on the second PDSCH(s) according to a UE capability of the UE.

Alternatively, when the first PDSCH(s) transmitted from TRP A and the second PDSCH(s) transmitted from TRP B are allocated to at least some symbols (e.g., symbols 1 and symbols 2,) temporally spaced apart in the same slot, the UE may not expect to receive TB 1 and TB 2 transmitted on the first PDSCH and TB 1' and TB 2' transmitted on the second PDSCH from the base station. Alternatively, TB the UE may receive TB 1 and TB 2 transmitted on the first PDSCH and TB 1' and TB 2' transmitted on the second PDSCH according to a UE capability of the UE. Alternatively, the UE may selectively receive the first PDSCH or the second PDSCH among TB 1 and TB 2 transmitted on the first PDSCH and TB 1' and TB 2' transmitted on the second PDSCH according to a UE capability of the UE.

Alternatively, when the first PDSCH(s) transmitted from TRP A and the second PDSCH(s) transmitted from TRP B are allocated to different slots, the UE may not expect to receive TB 1 and TB 2 transmitted on the first PDSCH and TB 1' and TB 2' transmitted on the second PDSCH from the base station. Alternatively, TB the UE may receive TB 1 and TB 2 transmitted on the first PDSCH and TB 1' and TB 2' transmitted on the second PDSCH according to a UE capability of the UE.

Figure 13:
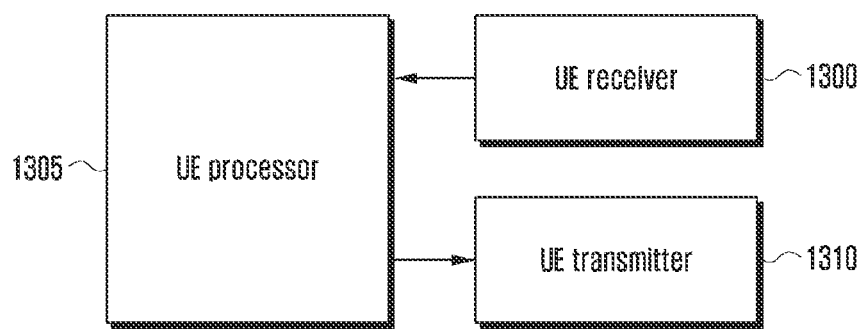
FIG. 13 illustrates the structure of a UE in a wireless communication system according to an embodiment.

FIG. 13 illustrates the structure of a UE in a wireless communication system according to an embodiment.

Referring to FIG. 13, the UE may include a UE receiver 1300, a UE transmitter 1310, and a UE processor 1305.

The UE receiver 1300 and the UE transmitter 1310 may be collectively referred to as a transceiver. The UE receiver 1300, the UE transmitter 1310, and the UE processor 1305 of the UE may operate according to the foregoing communication method of the UE. However, components of the UE are not limited to the aforementioned examples. For example, the UE may include additional components (e.g., a memory) or fewer components than the aforementioned components. In addition, the UE receiver 1300, the UE transmitter 1310, and the UE processor 1305 may be configured as a single chip.

The UE receiver 1300 and the UE transmitter 1310 (or the transceiver) may transmit and receive a signal to and from a base station. The signal may include control information and data. To this end, the transceiver may include an RF transmitter to upconvert and amplify the frequency of a transmitted signal and an RF receiver to perform low-noise amplification of a received signal and to downconvert the frequency of the received signal. However, this is only an embodiment of the transceiver, and components of the transceiver may vary.

In addition, the transceiver may receive a signal through a radio channel to output the signal to the UE processor 1305 and may transmit a signal output from the UE processor 1305 through the radio channel.

The memory may store a program and data necessary for the operation of the UE. The memory may store control information or data included in a signal obtained by the UE. The memory may be configured as a storage medium, such as a read-only memory (ROM), a random access memory (RAM), a hard disk, a compact disc (CD)-ROM, and a digital versatile disc (DVD), or a combination of storage media.

The UE processor 1305 may control a series of processes such that the UE may operate according to the foregoing embodiments. The UE processor 1305 may be configured as a controller or one or more processors.

Figure 14:
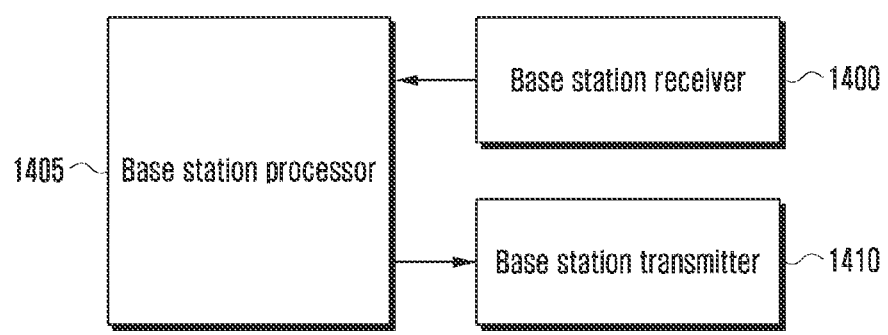
FIG. 14 illustrates the structure of a base station in a wireless communication system according to an embodiment.

FIG. 14 is a block diagram illustrating the structure of a base station in a wireless communication system according to an embodiment.

Referring to FIG. 14, the base station may include a base station receiver 1400, a base station transmitter 1410, and a base station processor 1405.

The base station receiver 1400 and the base station transmitter 1410 may be collectively referred to as a transceiver. The base station receiver 1400, the base station transmitter 1410, and the base station processor 1405 of the base station may operate according to the foregoing communication method of the base station. However, components of the base station are not limited to the aforementioned examples. For example, the base station may include additional components (e.g., a memory) or fewer components than the aforementioned components. In addition, the base station receiver 1400, the base station transmitter 1410, and the base station processor 1405 may be configured as a single chip.

The base station receiver 1400 and the base station transmitter 1410 (or the transceiver) may transmit and receive a signal to and from a UE. The signal may include control information and data. To this end, the transceiver may include an RF transmitter to upconvert and amplify the frequency of a transmitted signal and an RF receiver to perform low-noise amplification of a received signal and to downconvert the frequency of the received signal. However, this is only an embodiment of the transceiver, and components of the transceiver are not limited to the RF transmitter and the RF receiver.

In addition, the transceiver may receive a signal through a radio channel to output the signal to the base station processor 1405 and may transmit a signal output from the base station processor 1405 through the radio channel.

The memory may store a program and data necessary for the operation of the base station. The memory may store control information or data included in a signal obtained by the base station. The memory may be configured as a storage medium, such as a ROM, a RAM, a hard disk, a CD-ROM, and a DVD, or a combination of storage media.

The base station processor 1405 may control a series of processes such that the base station may operate according to the foregoing embodiments. The base station processor 1405 may be configured as a controller or one or more processors.

The embodiments of the disclosure described and shown in the specification and the drawings are merely specific examples that have been presented to easily explain the technical contents of the disclosure and help understanding of the disclosure, and are not intended to limit the scope. That is, it will be apparent to those skilled in the art that other variants based on the technical idea of the disclosure may be implemented. The above respective embodiments may be employed in combination, as necessary.

Herein, each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. A method performed by a terminal in a wireless communication system, the method comprising:
   receiving, from a base station, control information for scheduling downlink transmission using at least one transmission reception point (TRP);
   identifying that at least a part of a signal, transmitted by a first TRP of the at least one TRP, is to be retransmitted by a second TRP of the at least one TRP, based on the control information;
   identifying a code division multiplexing (CDM) group of the second TRP for receiving the at least the part of the signal based on the control information;
   receiving, from the second TRP, the at least the part of the signal based on the CDM group of the second TRP; and
   combining the signal received from the first TRP and the at least the part of the signal received from the second TRP.

2. The method of claim 1, wherein the control information comprises at least one of information on the CDM group of the TRP, demodulation reference signal (DMRS) port information indicating at least one DMRS port corresponding to the CDM group of the second TRP, modulation and coding scheme (MCS) information, a new data indicator (NDI), code block group transmission information (CBGTI), or code block group flushing-out information (CBGFI).

3. The method of claim 1, wherein all of the signal is received from the second TRP.

4. The method of claim 1, wherein the at least the part of the signal is mapped to a same codeword.

5. The method of claim 1,
   wherein the CDM group of the second TRP comprises at least one demodulation reference signal (DMRS) port associated with the second TRP, and
   wherein the at least the part of the signal received from the second TRP is demodulated based on the at least one DMRS port.

6. A method performed by a base station in a wireless communication system, the method comprising:
   generating control information for scheduling downlink transmission using at least one transmission reception point (TRP), wherein the control information indicates that at least a part of a signal, transmitted by a first TRP of the at least one TRP, is retransmitted by a second TRP of the at least one TRP and indicates a code division multiplexing (CDM) group of the second TRP for transmitting the at least the part of the signal;
   transmitting, to a terminal, the control information; and
   transmitting the at least the part of the signal to the terminal using the second TRP based on the CDM group of the second TRP.

7. The method of claim 6, wherein the control information comprises at least one of information on the CDM group of the TRP, demodulation reference signal (DMRS) port information indicating at least one DMRS port corresponding to the CDM group of the second TRP, modulation and coding scheme (MCS) information, a new data indicator (NDI), code block group transmission information (CBGTI), or code block group flushing-out information (CBGFI).

8. The method of claim 6, wherein all of the signal is transmitted to the terminal using the second TRP.

9. The method of claim 6, wherein the at least the part of the signal is mapped to a same codeword.

10. The method of claim 6,
wherein the CDM group of the second TRP comprises at least one demodulation reference signal (DMRS) port associated with the second TRP, and
wherein the at least the part of the signal transmitted from the second TRP is demodulated based on the at least one DMRS port.

11. A terminal in a wireless communication system, the terminal comprising:
a transceiver; and
a controller configured to:
receive, from a base station via the transceiver, control information for scheduling downlink transmission using at least one transmission reception point (TRP),
identify that at least a part of a signal, transmitted by a first TRP of the at least one TRP, is to be retransmitted by a second TRP of the at least one TRP, based on the control information,
identify a code division multiplexing (CDM) group of the second TRP for receiving the at least the part of the signal based on the control information,
receive, from the second TRP via the transceiver, the at least the part of the signal based on the CDM group of the second TRP, and
combine the signal received from the first TRP and the at least the part of the signal received from the second TRP.

12. The terminal of claim 11, wherein the control information comprises at least one of information on the CDM group of the TRP, demodulation reference signal (DMRS) port information indicating at least one DMRS port corresponding to the CDM group of the second TRP, modulation and coding scheme (MCS) information, a new data indicator (NDI), code block group transmission information (CBGTI), or code block group flushing-out information (CBGFI).

13. The terminal of claim 11, wherein
all of the signal is received from the second TRP.

14. The terminal of claim 11, wherein the at least the part of the signal is mapped to a same codeword.

15. The terminal of claim 11,
wherein the CDM group of the second TRP comprises at least one demodulation reference signal (DMRS) port associated with the second TRP, and
wherein the controller is configured to demodulate the at least the part of the signal received from the second TRP based on the at least one DMRS port.

16. A base station in a wireless communication system, the base station comprising:
a transceiver; and
a controller configured to:
generate control information for scheduling downlink transmission using at least one transmission reception point (TRP), wherein the control information indicates that at least a part of a signal, transmitted by a first TRP of the at least one TRP, is retransmitted by a second TRP of the at least one TRP and indicates a code division multiplexing (CDM) group of the second TRP for transmitting the at least the part of the signal,
transmit, to a terminal via the transceiver, the control information, and
transmit, to the terminal, the at least the part of the signal using the second TRP based on the CDM group of the second TRP.

17. The base station of claim 16, wherein the control information comprises at least one of information on the CDM group of the TRP, demodulation reference signal (DMRS) port information indicating at least one DMRS port corresponding to the CDM group of the second TRP, modulation and coding scheme (MCS) information, a new data indicator (NDI), code block group transmission information (CBGTI), or code block group flushing-out information (CBGFI).

18. The base station of claim 16, wherein
all of the signal is transmitted to the terminal using the second TRP.

19. The base station of claim 16, wherein the at least the part of the signal is mapped to a same codeword.

20. The base station of claim 16,
wherein the CDM group of the second TRP comprises at least one demodulation reference signal (DMRS) port associated with the second TRP, and
wherein the at least the part of the signal transmitted from the second TRP is demodulated based on the at least one DMRS port.

* * * * *